(12) United States Patent
Zhang et al.

(10) Patent No.: US 12,355,707 B2
(45) Date of Patent: Jul. 8, 2025

(54) RESOURCE CONFIGURATION FOR FULL-DUPLEX COMMUNICATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 345 days.

(21) Appl. No.: 17/878,856

(22) Filed: Aug. 1, 2022

(65) Prior Publication Data
US 2024/0039679 A1 Feb. 1, 2024

(51) Int. Cl.
*H04L 5/00* (2006.01)
*H04L 5/14* (2006.01)

(52) U.S. Cl.
CPC .......... *H04L 5/0094* (2013.01); *H04L 5/0051* (2013.01); *H04L 5/14* (2013.01)

(58) Field of Classification Search
CPC ........ H04L 5/0094; H04L 5/0051; H04L 5/14
See application file for complete search history.

(56) References Cited

U.S. PATENT DOCUMENTS

| | | | |
|---|---|---|---|
| 8,817,641 B2* | 8/2014 | Choi | H04W 16/14 |
| | | | 455/115.2 |
| 11,252,668 B2* | 2/2022 | Nory | H04W 52/0229 |
| 11,888,786 B2* | 1/2024 | Abotabl | H04W 72/23 |
| 12,075,356 B2* | 8/2024 | Islam | H04W 76/28 |
| 12,177,878 B2* | 12/2024 | Wei | H04L 27/26025 |
| 2018/0279289 A1* | 9/2018 | Islam | H04W 72/0446 |
| 2019/0124558 A1* | 4/2019 | Ang | H04L 5/001 |
| 2019/0253230 A1* | 8/2019 | Loehr | H04L 5/0098 |
| 2019/0313412 A1* | 10/2019 | Baldemair | H04L 5/0039 |
| 2019/0357292 A1* | 11/2019 | Cirik | H04L 5/0053 |
| 2021/0006318 A1* | 1/2021 | Kim | H04L 1/1812 |
| 2022/0225453 A1* | 7/2022 | Kim | H04W 76/20 |
| 2022/0329982 A1* | 10/2022 | Kim | H04L 1/1861 |

* cited by examiner

*Primary Examiner* — Bailor C Hsu
(74) *Attorney, Agent, or Firm* — Loza & Loza, LLP

(57) ABSTRACT

A user equipment (UE) may use a resource configuration to determine whether to transmit or receive on a particular sub-band during a given communication period (e.g., a time slot or a symbol duration). In some examples, a network entity provides a bit map to a UE where the bit map indicates how sub-bands for a given communication period are allocated for full-duplex transmissions. The UE may then determine, based on the bit map, whether to transmit or receive on a particular sub-band. In some examples, a network entity provides a resource configuration to a UE where the resource configuration indicates how half-duplex transmissions and full-duplex transmissions are configured over a period of time. In this case, the UE may be configured by a defined rule to determine, based on the resource configuration, whether to transmit or receive on a particular sub-band.

24 Claims, 22 Drawing Sheets

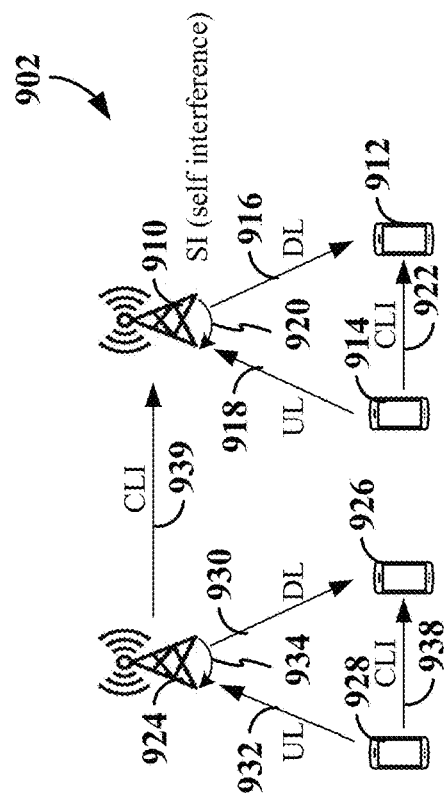
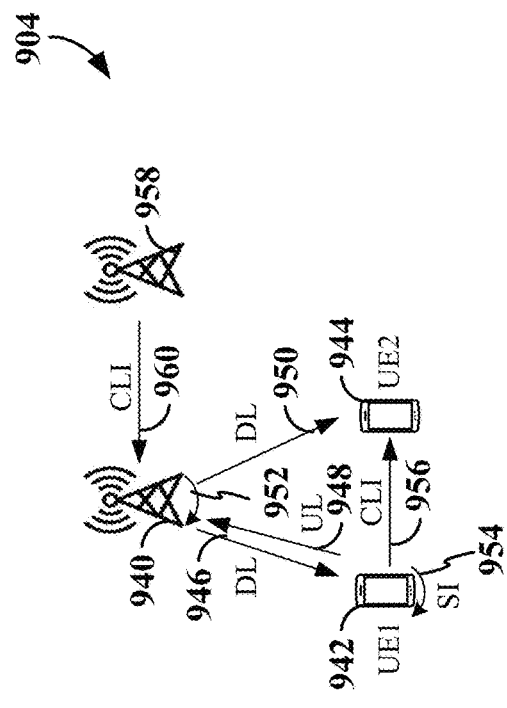
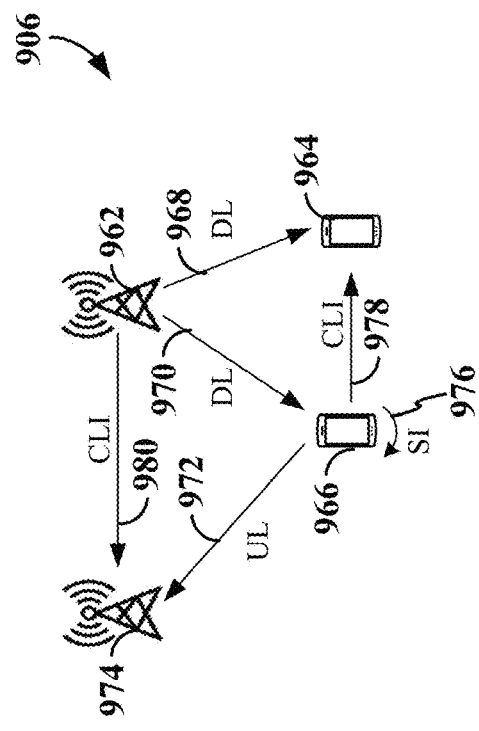
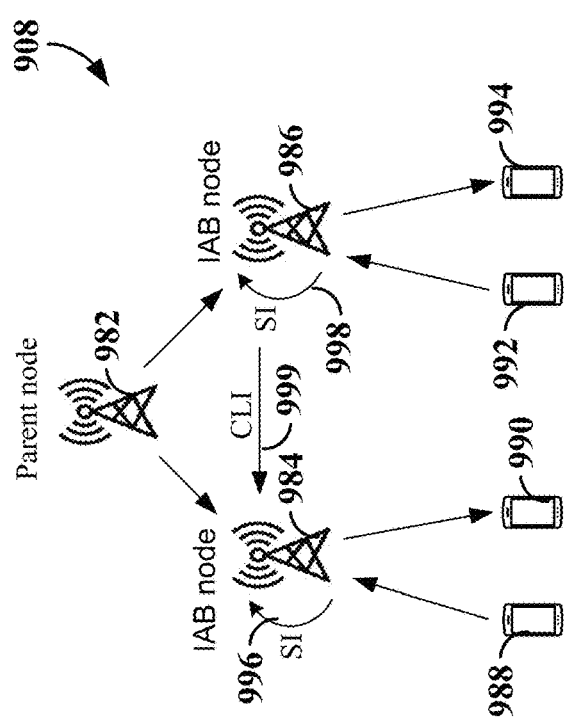
FIG. 9

RESOURCE CONFIGURATION FOR FULL-DUPLEX COMMUNICATION

TECHNICAL FIELD

The technology discussed below relates generally to wireless communication and, more particularly, to resource configurations for full-duplex communication.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) to be used by different UEs operating within the cell. Thus, each UE may transmit information to the base station via one or more of these resources and/or the base station may transmit information to one or more of the UEs via one or more of these resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first apparatus for wireless communication may include a processing system. The processing system may be configured to obtain a first bit map from a second apparatus, the first bit map indicating symbol-level or slot-level bandwidth switching to be used by the first apparatus on a first frequency band. The processing system may also be configured to at least one of obtain, from the second apparatus, first signaling based on the first bit map or output, for transmission to the second apparatus, second signaling based on the first bit map.

In some examples, a method for communication at a user equipment is disclosed. The method may include obtaining a first bit map from a second apparatus, the first bit map indicating symbol-level or slot-level bandwidth switching to be used by the first apparatus on a first frequency band. The method may also include at least one of obtaining, from the second apparatus, first signaling based on the first bit map or outputting, for transmission to the second apparatus, second signaling based on the first bit map.

In some examples, a first apparatus for communication may include means for obtaining a first bit map from a second apparatus, the first bit map indicating symbol-level or slot-level bandwidth switching to be used by the first apparatus on a first frequency band. The first apparatus may also include means for at least one of obtaining, from the second apparatus, first signaling based on the first bit map or outputting, for transmission to the second apparatus, second signaling based on the first bit map.

In some examples, a non-transitory computer-readable medium has stored therein instructions executable by a processing system of a first apparatus to obtain a first bit map from a second apparatus, the first bit map indicating symbol-level or slot-level bandwidth switching to be used by the first apparatus on a first frequency band. The computer-readable medium may also have stored therein instructions executable by the processing system of the first apparatus to at least one of obtain, from the second apparatus, first signaling based on the first bit map or output, for transmission to the second apparatus, second signaling based on the first bit map.

In some examples, a first apparatus for wireless communication may include a processing system. The processing system may be configured to output, for transmission to a second apparatus, a first bit map that indicates symbol-level or slot-level bandwidth switching to be used by the second apparatus on a first frequency band. The processing system may also be configured to at least one of output first signaling, for transmission to the second apparatus, based on the first bit map or obtain second signaling, from the second apparatus based on the first bit map.

In some examples, a method for communication at a user equipment is disclosed. The method may include outputting, for transmission to a second apparatus, a first bit map that indicates symbol-level or slot-level bandwidth switching to be used by the second apparatus on a first frequency band. The method may also include at least one of outputting first signaling, for transmission to the second apparatus, based on the first bit map or obtaining second signaling, from the second apparatus based on the first bit map.

In some examples, a first apparatus for communication may include means for outputting, for transmission to a second apparatus, a first bit map that indicates symbol-level or slot-level bandwidth switching to be used by the second apparatus on a first frequency band. The first apparatus may also include means for at least one of outputting first signaling, for transmission to the second apparatus, based on the first bit map or obtaining second signaling, from the second apparatus based on the first bit map.

In some examples, a non-transitory computer-readable medium has stored therein instructions executable by a processing system of a first apparatus to output, for transmission to a second apparatus, a first bit map that indicates symbol-level or slot-level bandwidth switching to be used by the second apparatus on a first frequency band. The computer-readable medium may also have stored therein instructions executable by the processing system of the first apparatus to at least one of output first signaling, for transmission to the second apparatus, based on the first bit map or obtain second signaling, from the second apparatus based on the first bit map.

In some examples, a first apparatus for wireless communication may include a processing system. The processing system may be configured to obtain, from a second apparatus, at least one of a first resource configuration or a second resource configuration, the first resource configuration indicating at least one first half-duplex resource assignment to be used by the first apparatus on a first frequency band during a first time period, either the first resource configuration or the second resource configuration further indicating a full-duplex resource assignment to be used by the first apparatus on one or more sub-bands of the first frequency band during a second time period. The processing system may also be configured to at least one of obtain first signaling from the second apparatus or output second signaling, for transmission to the second apparatus, on the one or more sub-bands of the first frequency band during the second time period based a defined rule that specifies that the first apparatus is to switch bandwidth according to the first resource configuration or the second resource configuration.

In some examples, a method for communication at a user equipment is disclosed. The method may include obtaining, from a second apparatus, at least one of a first resource configuration or a second resource configuration, the first resource configuration indicating at least one first half-duplex resource assignment to be used by the first apparatus on a first frequency band during a first time period, either the first resource configuration or the second resource configuration further indicating a full-duplex resource assignment to be used by the first apparatus on one or more sub-bands of the first frequency band during a second time period. The method may also include at least one of obtaining first signaling from the second apparatus or outputting second signaling, for transmission to the second apparatus, on the one or more sub-bands of the first frequency band during the second time period based a defined rule that specifies that the first apparatus is to switch bandwidth according to the first resource configuration or the second resource configuration.

In some examples, a first apparatus for communication may include means for obtaining, from a second apparatus, at least one of a first resource configuration or a second resource configuration, the first resource configuration indicating at least one first half-duplex resource assignment to be used by the first apparatus on a first frequency band during a first time period, either the first resource configuration or the second resource configuration further indicating a full-duplex resource assignment to be used by the first apparatus on one or more sub-bands of the first frequency band during a second time period. The first apparatus may also include means for at least one of obtaining first signaling from the second apparatus or outputting second signaling, for transmission to the second apparatus, on the one or more sub-bands of the first frequency band during the second time period based a defined rule that specifies that the first apparatus is to switch bandwidth according to the first resource configuration or the second resource configuration.

In some examples, a non-transitory computer-readable medium has stored therein instructions executable by a processing system of a first apparatus to obtain, from a second apparatus, at least one of a first resource configuration or a second resource configuration, the first resource configuration indicating at least one first half-duplex resource assignment to be used by the first apparatus on a first frequency band during a first time period, either the first resource configuration or the second resource configuration further indicating a full-duplex resource assignment to be used by the first apparatus on one or more sub-bands of the first frequency band during a second time period. The computer-readable medium may also have stored therein instructions executable by the processing system of the first apparatus to at least one of obtain first signaling from the second apparatus or output second signaling, for transmission to the second apparatus, on the one or more sub-bands of the first frequency band during the second time period based a defined rule that specifies that the first apparatus is to switch bandwidth according to the first resource configuration or the second resource configuration.

In some examples, a first apparatus for wireless communication may include a processing system. The processing system may be configured to output, for transmission to a second apparatus, at least one of a first resource configuration or a second resource configuration, the first resource configuration indicating at least one first half-duplex resource assignment to be used by the second apparatus on a first frequency band during a first time period, either the first resource configuration or the second resource configuration further indicating a full-duplex resource assignment to be used by the second apparatus on one or more sub-bands of the first frequency band during a second time period. The processing system may also be configured to at least one of output, for transmission to the second apparatus, first signaling or obtain, from the second apparatus, second signaling, on the one or more sub-bands of the first frequency band during the second time period based a defined rule that specifies that the second apparatus is to switch bandwidth according to the first resource configuration or the second resource configuration.

In some examples, a method for communication at a user equipment is disclosed. The method may include outputting, for transmission to a second apparatus, at least one of a first resource configuration or a second resource configuration, the first resource configuration indicating at least one first half-duplex resource assignment to be used by the second apparatus on a first frequency band during a first time period, either the first resource configuration or the second resource configuration further indicating a full-duplex resource assignment to be used by the second apparatus on one or more sub-bands of the first frequency band during a second time period. The method may also include at least one of outputting, for transmission to the second apparatus, first signaling or obtaining, from the second apparatus, second signaling, on the one or more sub-bands of the first frequency band during the second time period based a defined rule that specifies that the second apparatus is to switch bandwidth according to the first resource configuration or the second resource configuration.

In some examples, a first apparatus for communication may include means for outputting, for transmission to a second apparatus, at least one of a first resource configuration or a second resource configuration, the first resource configuration indicating at least one first half-duplex resource assignment to be used by the second apparatus on a first frequency band during a first time period, either the first resource configuration or the second resource configuration further indicating a full-duplex resource assignment to be used by the second apparatus on one or more sub-bands of the first frequency band during a second time period. The first apparatus may also include means for at least one of outputting, for transmission to the second apparatus, first signaling or obtaining, from the second apparatus, second signaling, on the one or more sub-bands of the first frequency band during the second time period based a defined rule that specifies that the second apparatus is to switch bandwidth according to the first resource configuration or the second resource configuration.

In some examples, a non-transitory computer-readable medium has stored therein instructions executable by a processing system of a first apparatus to output, for transmission to a second apparatus, at least one of a first resource configuration or a second resource configuration, the first resource configuration indicating at least one first half-duplex resource assignment to be used by the second apparatus on a first frequency band during a first time period, either the first resource configuration or the second resource configuration further indicating a full-duplex resource assignment to be used by the second apparatus on one or more sub-bands of the first frequency band during a second time period. The computer-readable medium may also have stored therein instructions executable by the processing system of the first apparatus to at least one of output, for transmission to the second apparatus, first signaling or obtain, from the second apparatus, second signaling, on the one or more sub-bands of the first frequency band during the second time period based a defined rule that specifies that the second apparatus is to switch bandwidth according to the first resource configuration or the second resource configuration.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 9 is a schematic illustration of examples of interference scenarios according to some aspects.

DETAILED DESCRIPTION

Figure 1:
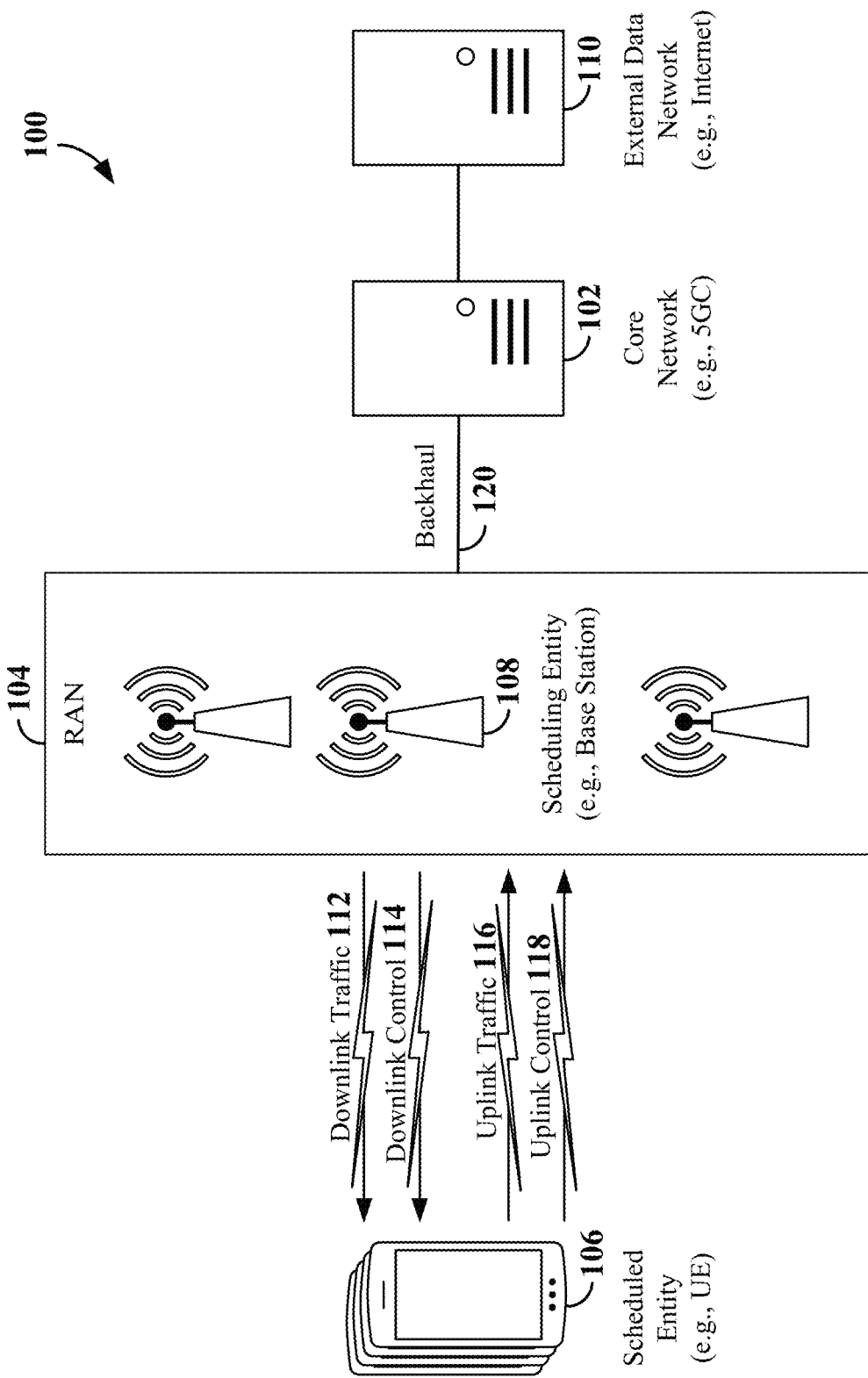
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to resource configurations for full-duplex communication. A wireless communication system may support half-duplex communication and full-duplex communication. For example, during a first slot, a base station may transmit downlink signals on an entire frequency band. In addition, during a second slot, the base station may transmit downlink signals on a first sub-band of the frequency band and receive uplink signals on a second sub-band of the frequency band. Other full-duplex modes of operation may be used in other examples.

The disclosure relates in some aspects to a resource configuration that a user equipment can use to determine whether to transmit or receive on a particular sub-band during a given communication period (e.g., a time slot or a symbol duration). In some examples, a base station provides a bit map to a UE where the bit map indicates how the frequency resources (e.g., sub-bands) for a given communication period (e.g., a time slot or a symbol duration) are allocated for full-duplex uplink transmissions and downlink transmissions. In this case, a UE may determine, based on the bit map, whether to transmit or receive on a particular sub-band (e.g., to mitigate cross link interference).

In some examples, a base station provides a resource configuration to a UE where the resource configuration indicates how half-duplex transmissions and full-duplex transmissions are configured over a period of time (e.g., multiple time slots or symbol periods). In this case, a UE may be configured by a defined rule to determine, based on the resource configuration, whether to transmit or receive on a particular sub-band (e.g., to mitigate cross link interference).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
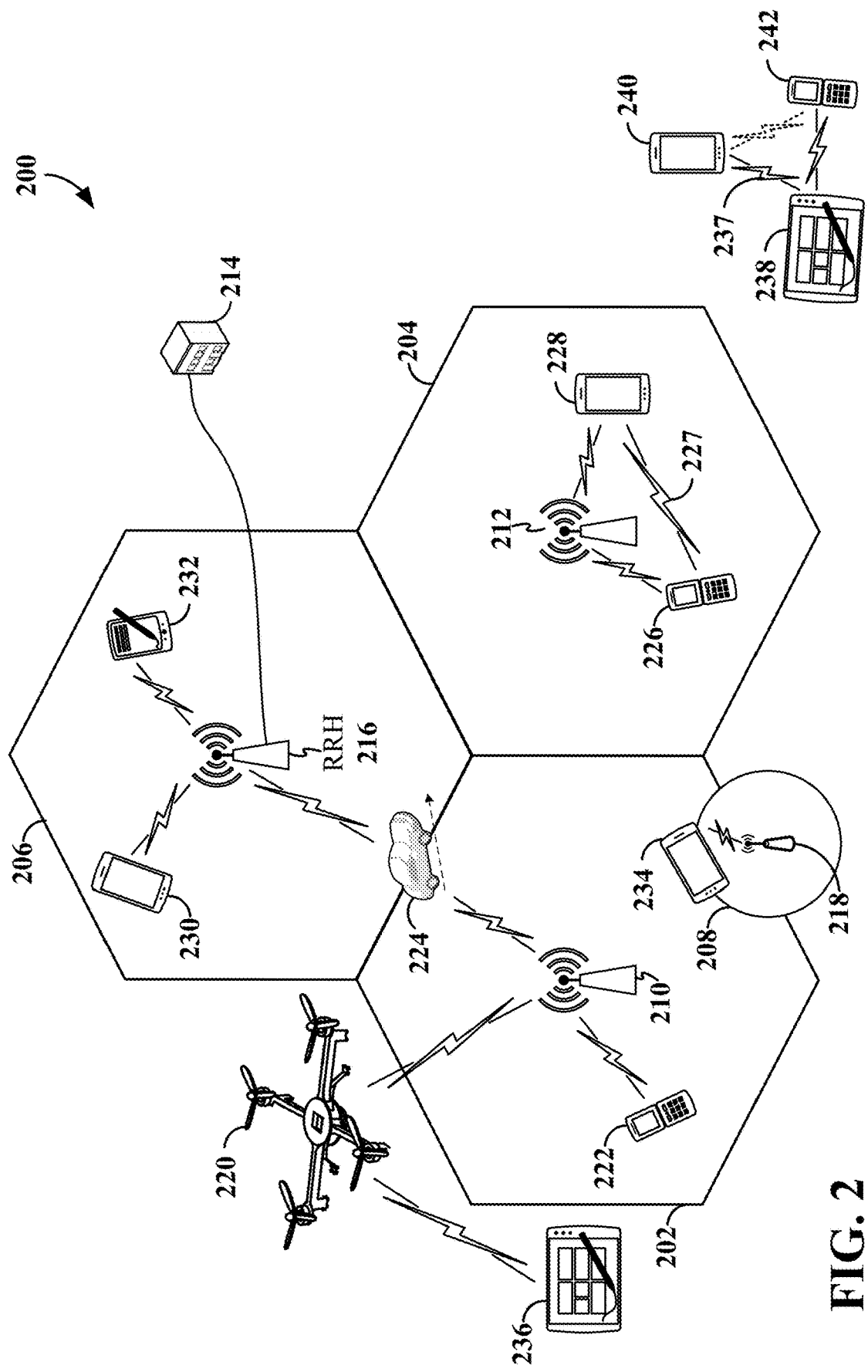
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
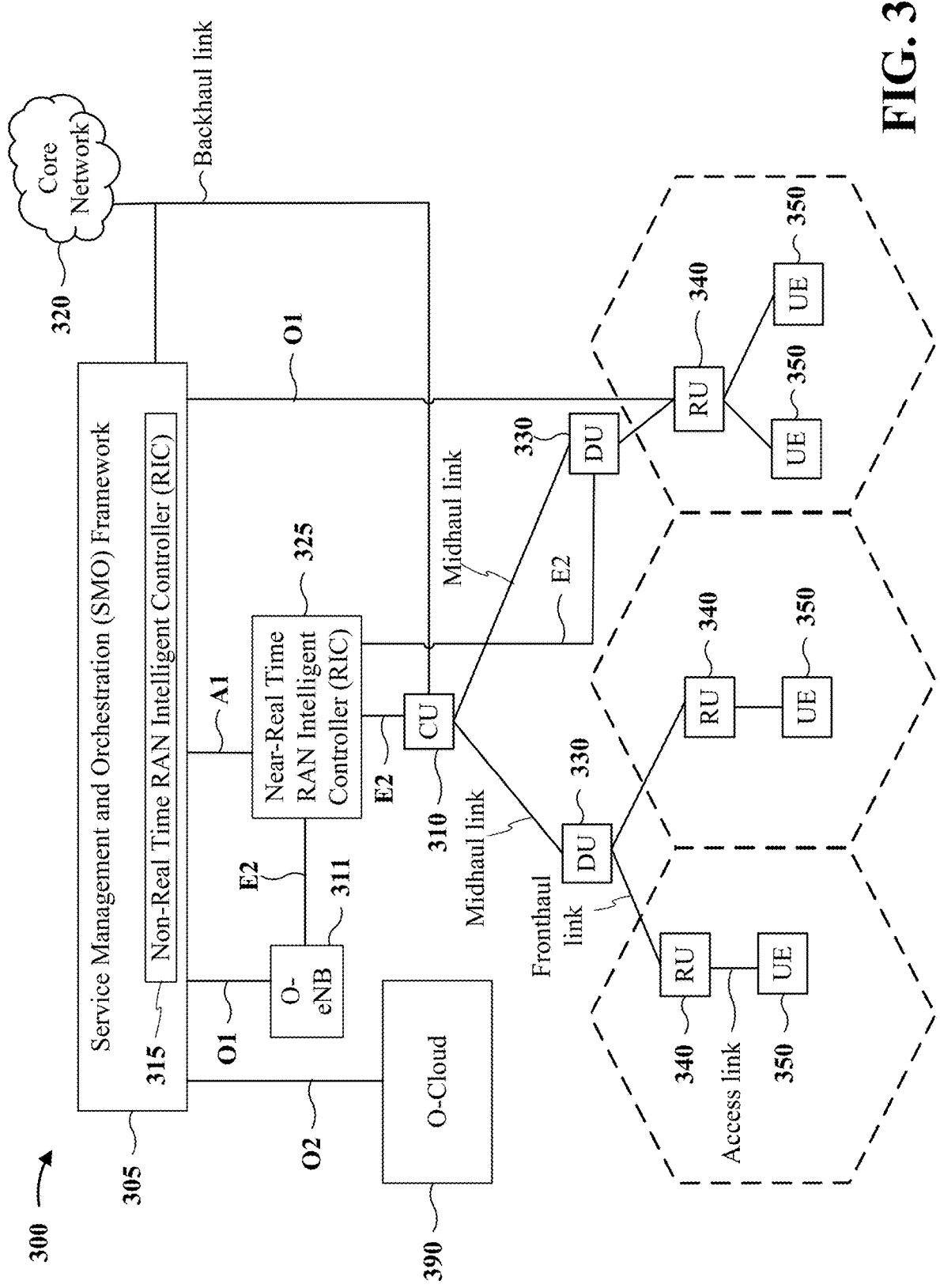
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
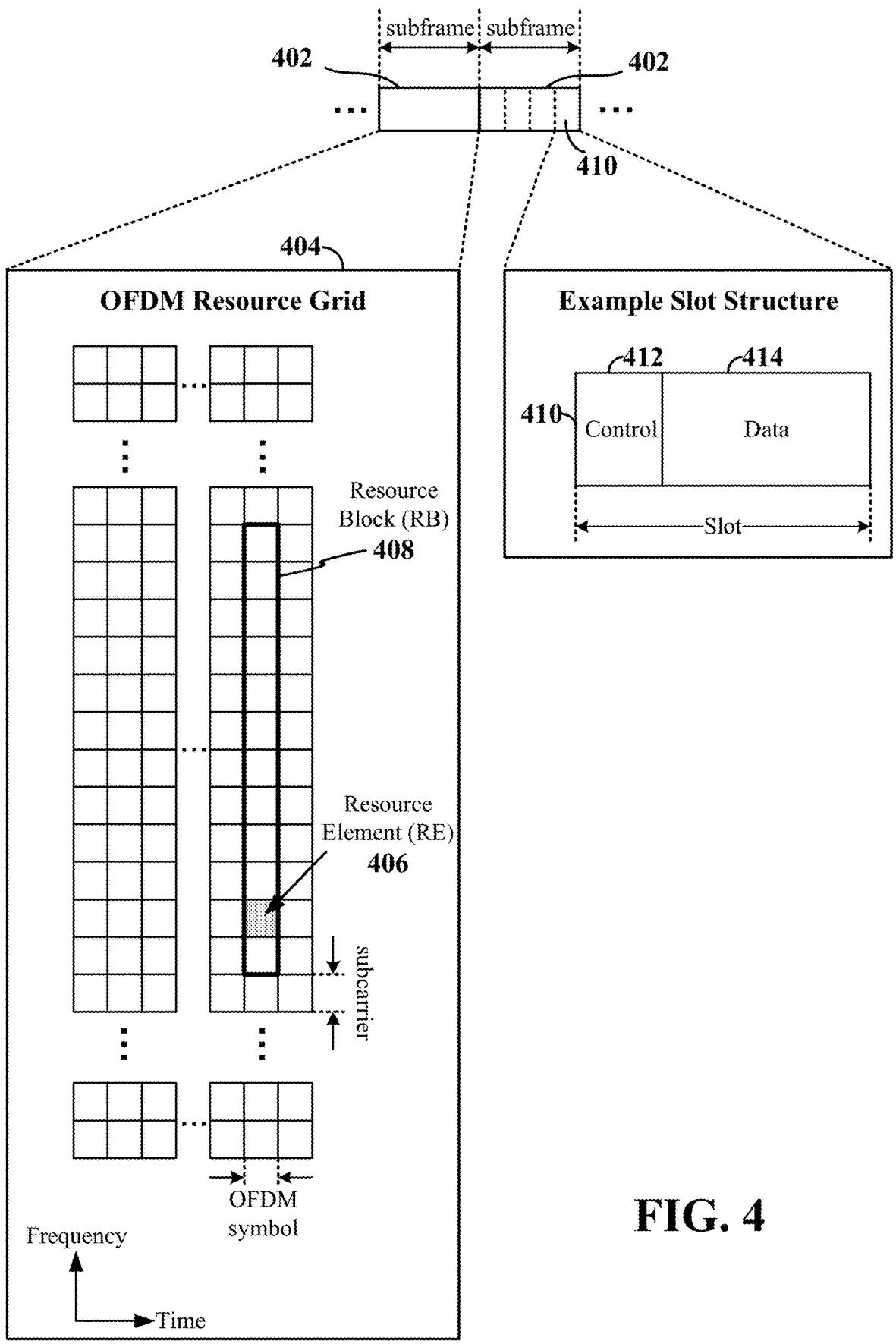
FIG. 4 is a schematic illustration of wireless resources in an air interface utilizing orthogonal frequency division multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIB s and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
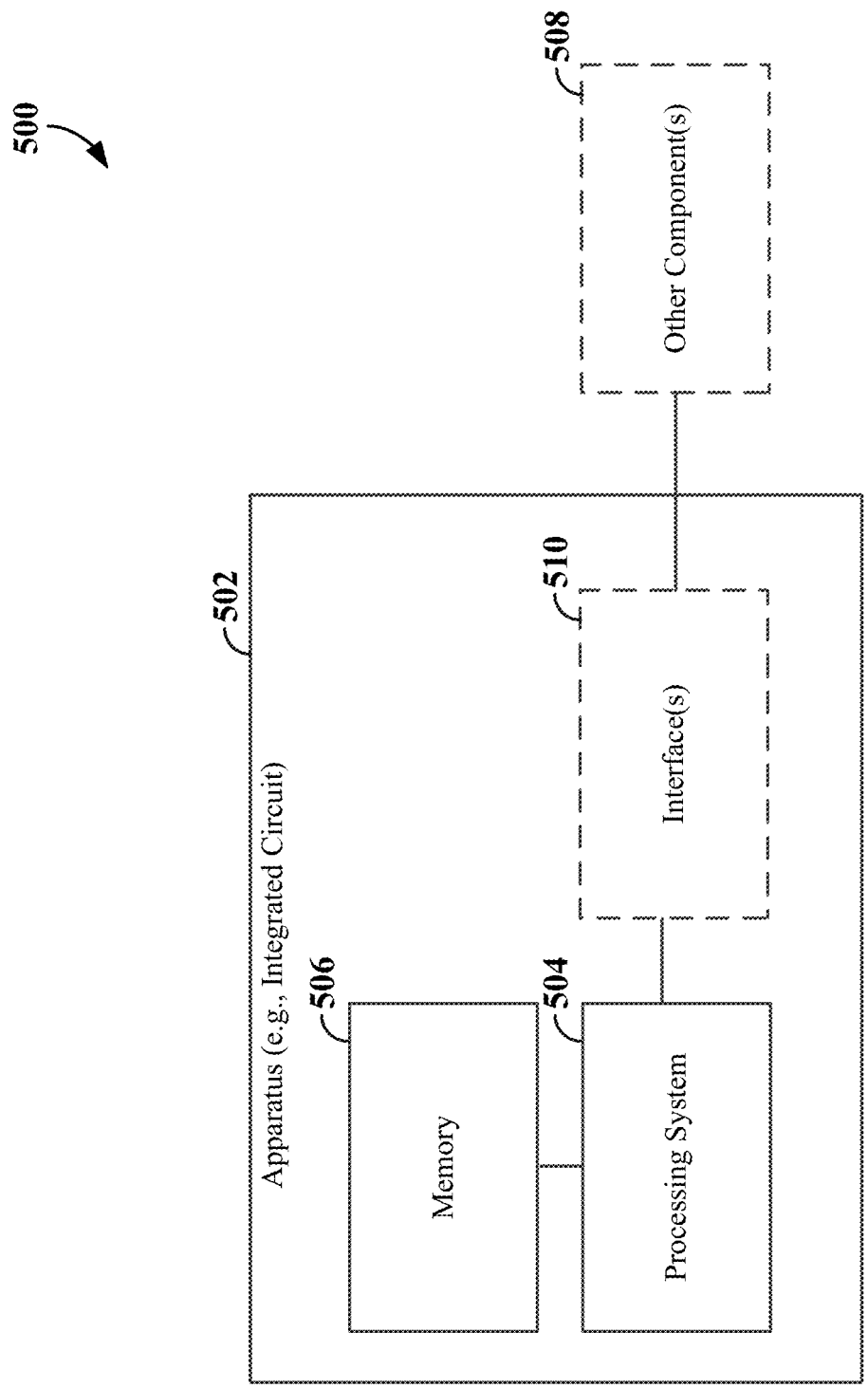
FIG. 5 is a schematic illustration of an example of an apparatus for communication according to some aspects.

FIG. 5 illustrates an example apparatus 500 according to certain aspects of the disclosure. In some examples, the apparatus 500 may be a BS, a UE, or some other type of wireless node (e.g., a node that utilizes wireless spectrum (e.g., the RF spectrum) to communicate with another node or entity). In some examples, the apparatus 500 may correspond to any of the apparatuses, UEs, scheduled entities, base stations (e.g., gNBs), scheduling entities, distributed units, control units, RAN nodes, or CN entities shown in any of FIGS. 1, 2, 3, 7, 8A, 9, 12, 13, 14, and 19.

The apparatus 500 includes an apparatus 502 (e.g., an integrated circuit) and, optionally, at least one other component 508. In some aspects, the apparatus 502 may be configured to operate in a wireless communication device (e.g., a UE, a BS, etc.) and to perform one or more of the operations described herein. The apparatus 502 includes a processing system 504, and a memory 506 coupled to the processing system 504. Example implementations of the processing system 504 are provided herein. In some examples, the processing system 504 of FIG. 5 may correspond to the processing system 1514 of FIG. 15. In some examples, the processing system 504 of FIG. 5 may correspond to the processing system 1914 of FIG. 19.

The processing system 504 is generally adapted for processing, including the execution of such programming stored on the memory 506. For example, the memory 506 may store instructions that, when executed by the processing system 504, cause the processing system 504 to perform one or more of the operations described herein.

In some implementations, the apparatus 502 communicates with at least one other component (e.g., a component 508 external to the apparatus 502) of the apparatus 500. To this end, in some implementations, the apparatus 502 may include at least one interface 510 (e.g., a send and/or receive interface) coupled to the processing system 504 for outputting and/or obtaining (e.g., sending and/or receiving) information (e.g., received information, generated information, decoded information, messages, etc.) between the processing system 504 and the other component(s) 508. In some implementations, the interface 510 may include an interface bus, bus drivers, bus receivers, buffers, other suitable circuitry, or a combination thereof. In some implementations, the interface 510 may include radio frequency (RF) circuitry (e.g., an RF transmitter and/or an RF receiver). In some implementations, the interface 510 may be configured to interface the apparatus 502 to one or more other components of the apparatus 500 (other components not shown in FIG. 5). For example, the interface 510 may be configured to interface the processing system 504 to a radio frequency (RF) front end (e.g., an RF transmitter and/or an RF receiver).

The apparatus 502 may communicate with other apparatuses in various ways. In cases where the apparatus 502 includes an RF transceiver (not shown in FIG. 5), the apparatus may transmit and receive information (e.g., a frame, a message, bits, etc.) via RF signaling. In some cases, rather than transmitting information via RF signaling, the apparatus 502 may have an interface to provide (e.g., output, send, transmit, etc.) information for RF transmission. For example, the processing system 504 may output information, via a bus interface, to an RF front end for RF transmission. Similarly, rather than receiving information via RF signaling, the apparatus 502 may have an interface to obtain information that is received by another apparatus. For example, the processing system 504 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Figures 6A, 6B:
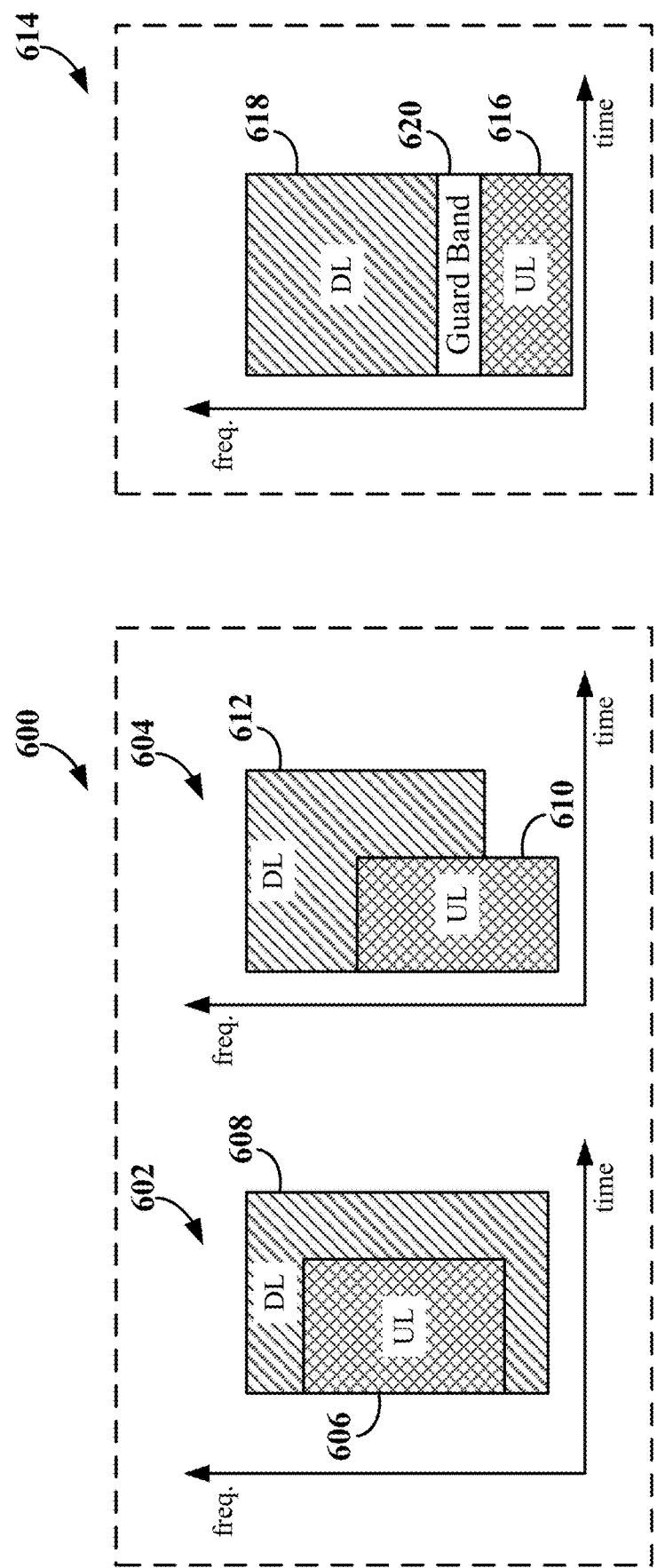
FIG. 6A is a diagram illustrating two examples of in-band full-duplex (IBFD) according to some aspects.
FIG. 6B is a diagram illustrating an example of sub-band full-duplex (SBFD) according to some aspects.

As mentioned above, a UE and/or a base station (e.g., gNB) may use full-duplex communication. Various examples of full-duplex operation are illustrated in FIGS. 6A and 6B. FIG. 6A is a diagram illustrating two examples of in-band full-duplex (IBFD) modulation 600 according to some aspects of the disclosure. In the examples shown in FIG. 6A, time is illustrated along the horizontal axis while frequency is illustrated along the vertical axis. A first example 602 of IBFD is depicted on the left while a second example 604 is depicted on the right. In the first example 602, the UL time-frequency resources 606 completely overlap with a portion of the DL time-frequency resources 608. In the second example 604, the UL time-frequency resources 610 partially overlap with a portion of the DL time-frequency resources 612. Accordingly, a device, for example a base station and/or a scheduled entity, employing IBFD may transmit and receive on the same time and frequency resources. That is, the device may transmit and receive at the same time(s) at the same frequency (or frequencies). The UL and DL share the same time and frequency resources. The overlap in time-frequency resources may be complete (full overlap), as in the first example 602, or partial, as in the second example 604.

FIG. 6B is a diagram illustrating an example of SBFD 614 according to some aspects of the disclosure. In the example shown in FIG. 6B, time is illustrated along the horizontal axis while frequency is illustrated along the vertical axis. In SBFD 614, a device may transmit and receive at the same time but on different frequency resources (e.g., different sub-bands within the same carrier bandwidth). In some examples, the different frequency resources may be in unpaired spectrum. The UL resources 616 are separated from the DL resources 618 by a guard band 620. In some scenarios, the guard band 620 may be relatively narrow (e.g., a few RBs). Consequently, a transmission in the UL resources 616 may result in leakage in the DL resources 618, and vice versa.

Figure 7:
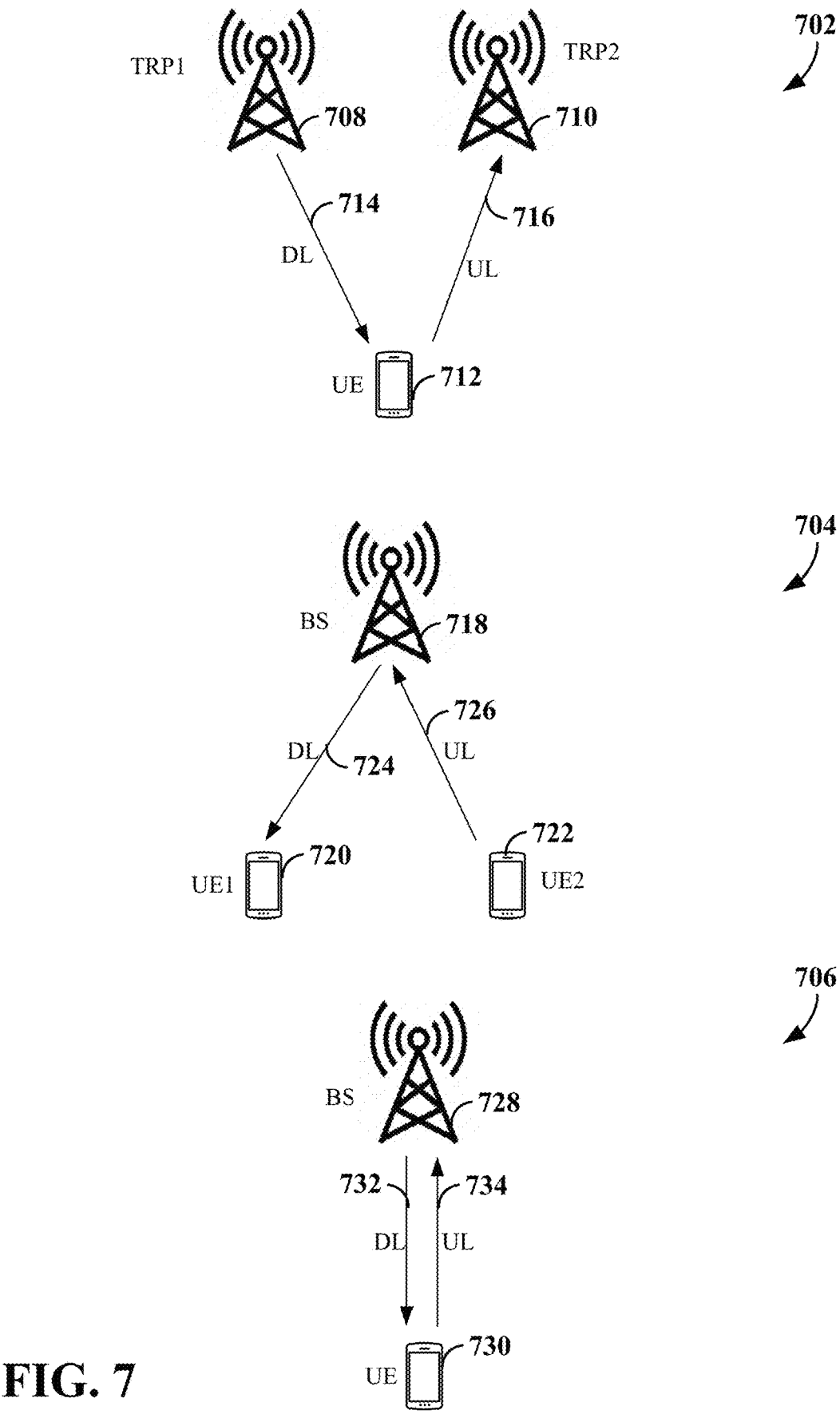
FIG. 7 is a schematic illustration of examples of full-duplex (FD) use cases according to some aspects.

FIG. 7 illustrates several examples of full-duplex uses cases including a first use case 702, a second use case 704, and a third use case 706. Other use cases may be used in other examples.

In the first use case 702, a first TRP 708 and a second TRP 710 of a network entity such as a base station use full-duplex communication to communicate with a UE 712. For example, as illustrated, the first TRP 708 may transmit a downlink transmission 714 to the UE 712 at the same time that the UE 712 transmits an uplink transmission 716 to the second TRP 710. As another example, the second TRP 710 may transmit a downlink transmission (not shown) to the UE 712 at the same time that the UE 712 transmits an uplink transmission (not shown) to the first TRP 708.

In the second use case 704, a network entity such as a base station 718 uses full-duplex communication to communicate with a first UE 720 and a second UE 722. For example, as illustrated, the base station 718 may transmit a downlink transmission 724 to the first UE 720 at the same time that the second UE 722 transmits an uplink transmission 726 to the base station 718. As another example, the base station 718 may transmit a downlink transmission (not shown) to the second UE 722 at the same time that the first UE 720 transmits an uplink transmission (not shown) to the base station 718.

In the third use case 706, a network entity such as a base station 728 uses full-duplex communication to communicate with a UE 730. For example, as illustrated, the base station 728 may transmit a downlink transmission 732 to the UE 730 at the same time that the UE 730 transmits an uplink transmission 734 to the base station 728.

In some examples, the base station 718 and the base station 728 may correspond to any of the network entities, base stations, CUs, DUs, RUs, or scheduling entities shown in any of FIGS. 1, 2, 3, 5, 8A, 9, 12, 13, 14, and 19. In some examples, the first TRP 708 and the second TRP 710 may correspond to any of the RUs, base stations, or scheduling entities shown in any of FIGS. 1, 2, 3, 5, 8A, 9, 10, 11, 12, and 19. In some examples, the user equipment 712, the first user equipment 720, the second user equipment 722, and the user equipment 730 may correspond to any of the UEs, or scheduled entities shown in any of FIGS. 1, 2, 3, 5, 9, 12, 13, 14, and 15.

Figure 8A:
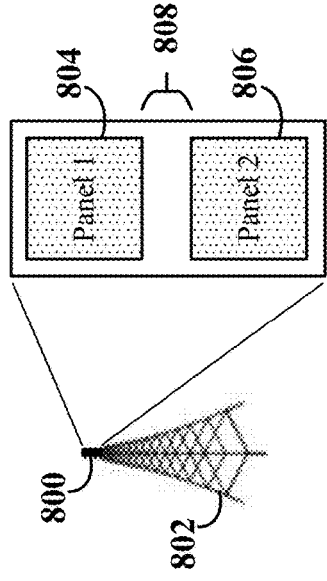
FIG. 8A is a schematic diagram depicting an antenna array according to some aspects.
Figure 8B:
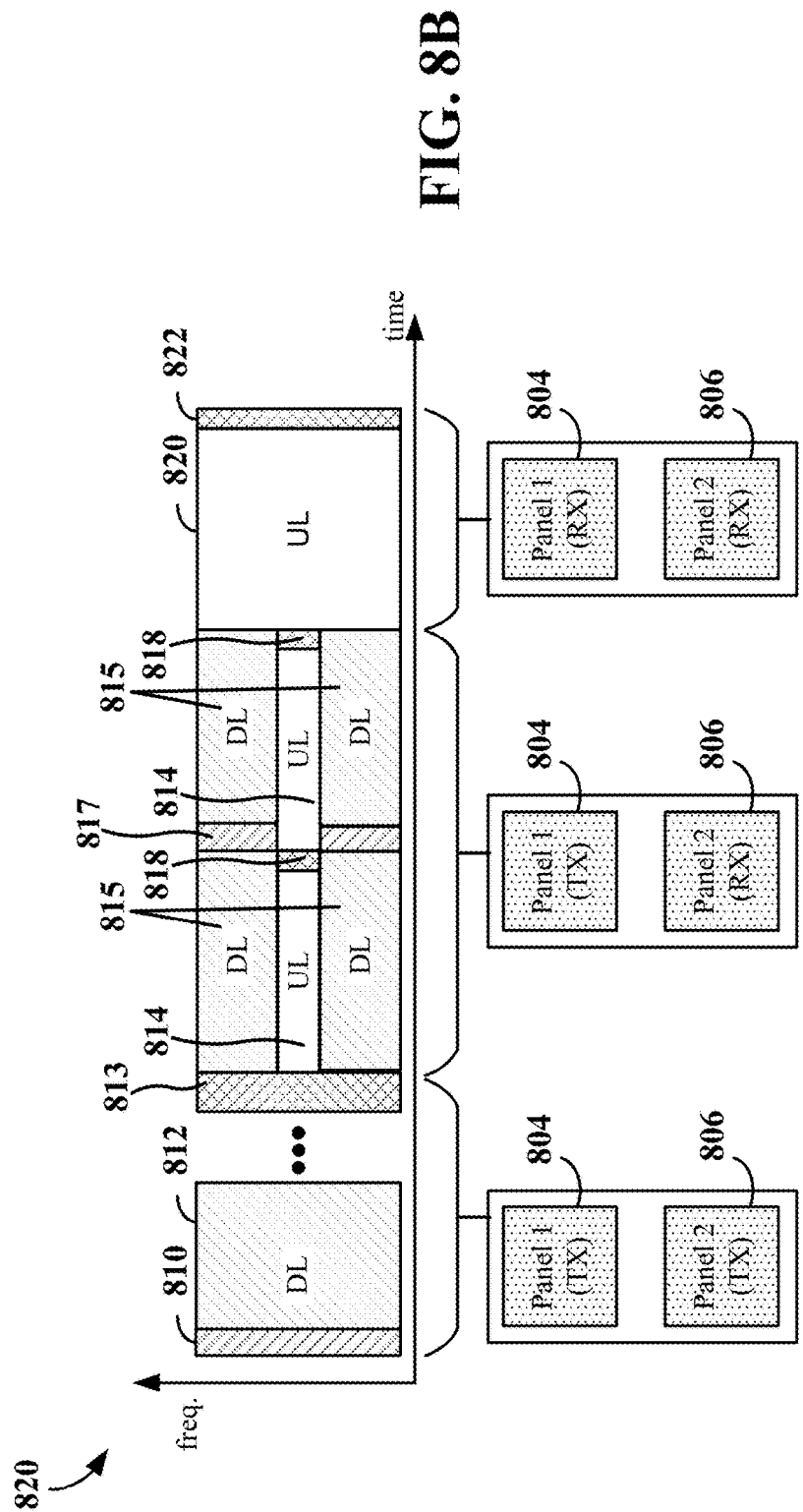
FIG. 8B is a diagram depicting the transmission or reception configuration of two panels.

FIGS. 8A and 8B illustrate that a wireless communication device (e.g., a network entity, a UE, etc.) may use multiple antenna panels to support full-duplex communication. FIG. 8A is a schematic diagram depicting an antenna array 800 of a TRP atop a network entity such as a base station 802 according to some aspects of the disclosure. The antenna array 800 is divided into two panels (panel 1 804, panel 2 806) with a physical separation 808 therebetween. Each of the two panels may be a subarray of antennas. A given panel may transmit and/or receive a beam or a beam group. A different number of panels may be used in other examples. In some examples, the base station 802 may correspond to any of the network entities, base stations, CUs, DUs, RUs, or scheduling entities shown in any of FIGS. 1, 2, 3, 5, 7, 9, 10, 11, 12, and 19.

Other types of devices may include multi-panel antenna arrays for full-duplex communication. For example, a UE may have a first panel on one side of the UE and a second panel on an opposite side of the UE. As another example, a UE may have four panels, with one panel on each corner of the UE.

FIG. 8B is a diagram depicting the transmission or reception configuration of the two panels (panel 1 804 and panel 2 806 of FIG. 8A or two panels on a UE, etc.). The transmission (TX) and reception (RX) configurations of the two panels are depicted for various DL and UL channels as may be implemented in a device (e.g., a scheduling entity or a scheduled entity) implementing flexible TDD according to some aspects of the disclosure.

As mentioned above, flexible TDD may involve in some examples using two panels to operate in either a TDD mode (with both panels on the gNB and one or more panels on the UE configured for either DL or UL) or an SBFD mode (with one panel on each of the gNB and UE configured for UL and another panel on each of the gNB and UE configured for DL) as described below with reference to FIG. 8B.

At the left of FIG. 8B, when the antenna array 800 is communicating in only a single direction at a time, both panel 1 804 and panel 2 806 may be configured for the single-direction communication as an example of a TDD mode showing the DL transmission. For example, both panels 804 and 806 may be configured to transmit DL control 810, DL data 812, and DL data 813 as an example of DL transmissions during TDD mode. At the center of FIG. 8B, when the antenna array 800 is simultaneously transmitting a combination of DL data 815 and DL control 817 and receiving UL data 814 (e.g., PUSCH) and UL control 818, panel 1 804 may be configured for DL transmission (i.e., TX) and panel 2 806 may be configured for UL reception (i.e., RX). At the right of FIG. 8B, when the antenna array 800 is only receiving UL data 820 (e.g., PUSCH) and UL control 822, both panel 1 804 and panel 2 806 may be configured for UL reception. The antenna array 800 is thus configurable for both TDD and full-duplex operation (e.g., flexible TDD). The physical separation 808 between panel 1 804 and panel 2 806 may provide improved isolation between the panels (e.g., greater than about dB of improved isolation) when compared to two panels without the physical separation 808. The above discussion also may be applicable to an antenna array in another type of device (e.g., a UE, with the references to DL and UL reversed).

FIG. 9 illustrates several examples of full-duplex interference scenarios including a first scenario 902, a second scenario 904, a third scenario 906, and a fourth scenario 908. Other interference scenarios may be possible.

In the first scenario 902, a network entity such as a base station 910 (e.g., a full-duplex gNB) uses full-duplex communication to communicate with a UE 912 (e.g., a half-duplex UE) and a UE 914 (e.g., a half-duplex UE). For example, the base station 910 may transmit a downlink transmission 916 to the UE 912 at the same time that the UE 914 transmits an uplink transmission 918 to the base station 910. In this case, the downlink transmission 916 may result in self-interference 920 at the base station 910 when the base station 910 is attempting to decode the uplink transmission 918. In addition, the uplink transmission 918 may result in cross link interference (CLI) 922 at the UE 912 when the UE 912 is attempting to decode the downlink transmission 916.

Also in the first scenario 902, a base station 924 (e.g., a full-duplex gNB) uses full-duplex communication to communicate with a UE 926 (e.g., a half-duplex UE) and a UE 928 (e.g., a half-duplex UE). For example, the base station 924 may transmit a downlink transmission 930 to the UE 926 at the same time that the UE 928 transmits an uplink transmission 932 to the base station 924. In this case, the downlink transmission 930 may result in self-interference 934 at the base station 924 when the base station 924 is attempting to decode the uplink transmission 932. In addition, the uplink transmission 932 may result in cross link interference (CLI) 922 at the UE 926 when the UE 926 is attempting to decode the downlink transmission 930. Moreover, the downlink transmission 930 by the base station 924 may result in cross link interference 939 at the base station 910 when the base station 910 is attempting to decode the uplink transmission 918.

In the second scenario 904, a network entity such as a base station 940 (e.g., a full-duplex gNB) uses full-duplex communication to communicate with a UE 942 (a full-duplex UE) and half-duplex communication to communicate with a UE 944 (e.g., a half-duplex UE). For example, the base station 940 may transmit a downlink transmission 946 to the UE 942 at the same time that the UE 942 transmits an uplink transmission 948 to the base station 940. In addition, at the same time, the base station 940 may transmit a downlink transmission 950 to the UE 944. In this case, the downlink transmission 946 or 950 may result in self-interference 952 at the base station 940 when the base station 940 is attempting to decode the uplink transmission 948. In addition, the uplink transmission 948 may result in self-interference 954 at the UE 942 when the UE 942 is attempting to decode the downlink transmission 946. Also, the uplink transmission 948 may result in cross link interference (CLI) 956 at the UE 944 when the UE 944 is attempting to decode the downlink transmission 950. Furthermore, a downlink transmission by a nearby base station 958 may result in cross link interference 960 at the base station 940 when the base station 940 is attempting to decode the uplink transmission 948.

In the third scenario 906, a network entity such as a base station 962 (e.g., a half-duplex gNB) uses half-duplex communication to communicate with a UE 964 (e.g., a half-duplex UE) and a UE 966 (e.g., a full-duplex UE). For example, the base station 962 may transmit a downlink transmission 968 to the UE 964 at the same time that the base station 962 transmits a downlink transmission 970 to the UE 966. At the same time, the UE 966 may transmit an uplink transmission 972 to a base station 974. In this case, the uplink transmission 972 may result in self-interference 976 at the UE 966 when the UE 966 is attempting to decode the downlink transmission 970. In addition, the uplink transmission 972 may result in cross link interference (CLI) 978 at the UE 964 when the UE 964 is attempting to decode the downlink transmission 968. Also, the downlink transmission 968 or 970 may result in cross link interference (CLI) 980 at the base station 974 when the base station 974 is attempting to decode the uplink transmission 972.

In the fourth scenario 908, a network entity such as a parent node 982 controls two integrated access backhaul (IAB) nodes 984 and 986. The IAB node 984 uses full-duplex communication to communicate with a UE 988 and a UE 990. The IAB node 986 uses full-duplex communication to communicate with a UE 992 and a UE 994. As indicated, transmissions by the IAB node 984 may result in self-interference 996 at the IAB node 984 and transmissions by the IAB node 986 may result in self-interference 998 at the IAB node 986. In addition, transmissions by the IAB node 986 may result in CLI 999 at the IAB node 984, or vice versa.

In some examples, the base stations 910, 924, 940, 958, 962, 974, and 982 may correspond to any of the network entities, base stations, CUs, DUs, RUs, or scheduling entities shown in any of FIGS. 1, 2, 3, 5, 7, 8A, 12, 13, 14, and 19. In some examples, the user equipment 912, 914, 926, 928, 942, 944, 964, 966, 988, 990, 992, 994 may correspond to any of the UEs, or scheduled entities shown in any of FIGS. 1, 2, 3, 5, 7, 12, 13, 14, and 15.

In some examples, the use of full-duplex may provide benefits such as an increased uplink (UL) duty cycle. This, in turn, may lead to a reduction in latency. For example, it may be possible to receive a downlink (DL) signal in UL-only slots, which can enable latency savings and UL coverage improvement. The use of full-duplex may also result in enhanced system capacity, resource utilization, and spectrum efficiency. Also, the use of full-duplex may enable flexible and dynamic UL/DL resource adaption according to UL/DL traffic in a robust manner. Furthermore, the use of full-duplex may provide solutions to basic dynamic TDD challenges. As discussed above, full-duplex capability may be conditional on beam separation, self-interference between the DL and the UL, and clutter echo.

In some examples, there may be co-existing full-duplex and half duplex resources for a gNB operating in half-duplex mode or full-duplex mode in different time resources. For example, in the first scenario 902 of FIG. 9 where a full-duplex base station 924 serves a half-duplex UE 926 and a half-duplex UE 928, a pre-configured bandwidth may be defined for half-duplex operation of each UE 926, 928. In this case, the DL reference signal (RS) that the base station 924 transmits to the UEs 926 and 926 may occupy the entire preconfigured bandwidth.

However, since the base station 924 may operate in a full-duplex mode during some slots (e.g., as shown FIG. 8B), the base station 924 will not use all of the pre-configured bandwidth for DL transmissions during those slots. In this case, some of the DL reference signals (RSs) may be for sub-band full-duplex operation with reduced DL bandwidth, e.g., 60% of the pre-configured half-duplex bandwidth.

In some wireless communication systems, the same slot pattern is used on all BWP configurations for each component carrier. To change the slot pattern, a base station will send a DCI for a BWP switch to the affected UEs prior to the time of the change to enable the UEs to decode the DCI and change their configurations accordingly. In practice, such a procedure may be relatively inefficient (e.g., in terms of signaling overhead) for full-duplex scenarios.

The disclosure relates in some aspects to dynamically switching the bandwidth used for receiving signaling and/or transmitting signaling. For example, a UE may switch to a reduced bandwidth to receive DL reference signals (RSs) and/or other signaling (e.g., CSI-RS, etc.). As another example, a UE may switch to a reduced bandwidth to transmit periodic UL signals (e.g., semi-persistent scheduling (SPS) signaling, configured grant (CG) signaling, or sounding reference signal (SRS) signaling) and/or other signaling. Switching to such a reduced bandwidth can save UE power and reduce the amount of interference that is leaked between nearby devices (e.g., nearby UEs).

In some examples, the reduced bandwidth is associated with a switch between half-duplex signaling and SBFD signaling at a network entity (e.g., a gNB). For example, when the network entity is transmitting to a UE during a half-duplex mode of operation, the network entity may use the entire configured bandwidth for transmitting RSs to a half-duplex UE. However, when the network entity is operating in a SBFD mode of operation (e.g., to concurrently communicate with multiple UEs), the network entity may use the reduced bandwidth for transmitting RSs to a first half-duplex UE since the network entity may use the rest of the bandwidth for receiving UL signaling from a second half-duplex UE. The techniques described herein may also be applicable to other types of duplexing (e.g., IBFD, etc.).

The disclosure relates in some aspect to techniques for indicating RS bandwidth switching to a UE. In some aspects, these techniques may have lower overhead and result in power savings that might not otherwise be achieved (e.g., using conventional techniques such as BWP switching).

In some examples, a network entity (e.g., a gNB) signals to UE a symbol-level (or slot-level) pattern (e.g., a bit map) where the RS (e.g., BFD RS, PL RS, CSI-RS) bandwidth may be changed to a pre-configured per symbol-level (or slot-level) bandwidth. For example, during full-duplex resources/symbols of a UE's serving network entity or a neighbor network entity, to avoid receiving/transmitting interference from an UL bandwidth resource to a DL bandwidth resource from/to the serving network entity or the neighbor network entity, a UE can follow the indicated bit-map to switch the RS to occupy a reduced DL bandwidth. Compared with legacy BWP switching signaling, the use of adapted RS bandwidth bit-map switching (e.g., signaling a bit-map pattern) can avoid frequent DL BWP change signaling and thereby save overhead.

Figure 10:
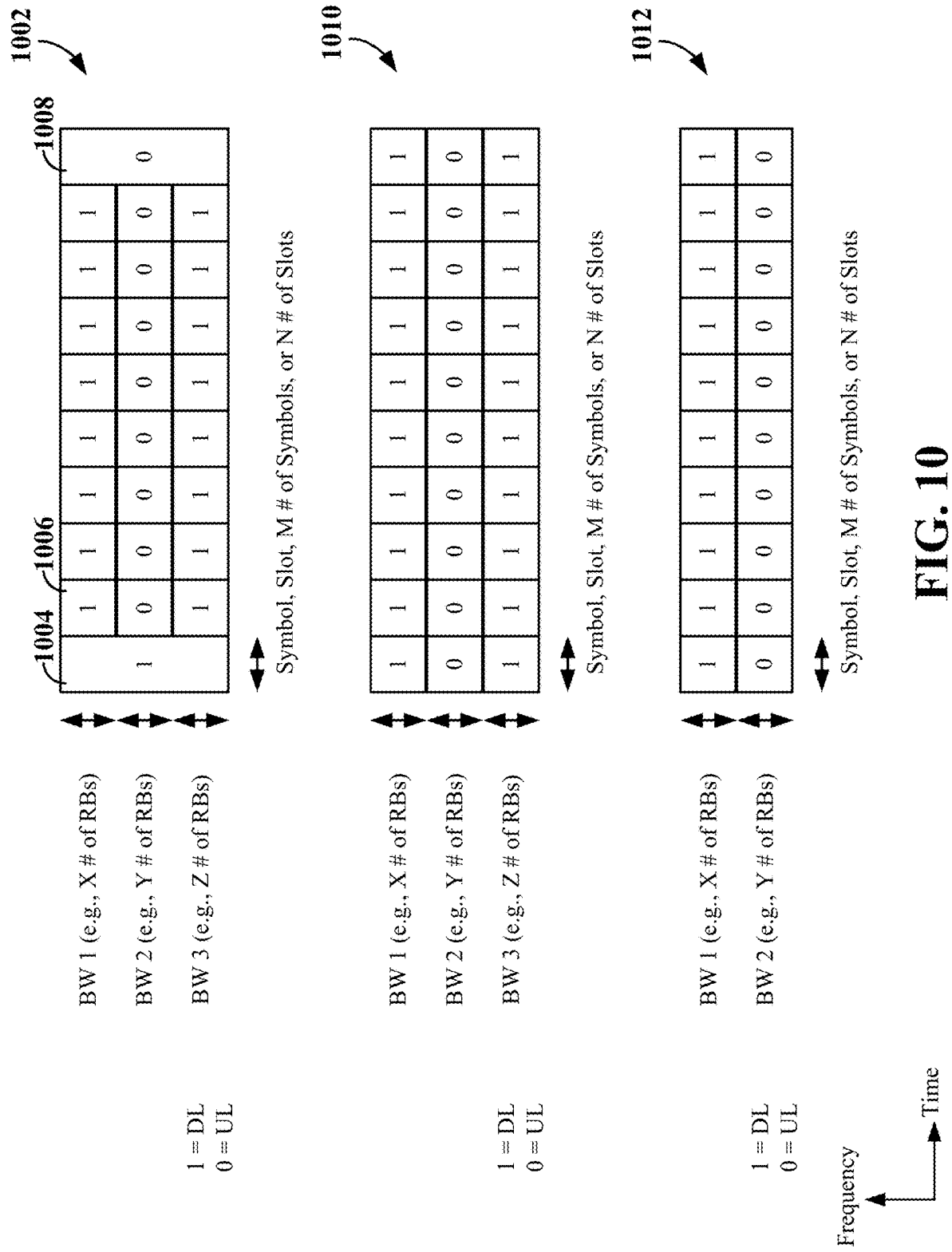
FIG. 10 is a conceptual illustration of different examples of bit maps according to some aspects.

FIG. 10 illustrates several examples of bit maps that may be used to indicate a bandwidth switch. Other bit map patterns may be used in other examples. In these examples, a bit value of 1 indicates a DL resource and a bit value of 0 indicates an UL resource. Other types of resources (e.g., flexible resources, etc.) may be indicated in other examples. Also, in these examples, each time instance indicated by the bit map may correspond to a single symbol, a specified number of symbols, a single slot, a specified number of slots, or some other time duration. In addition, in these examples, the allocated bandwidth is indicated as potentially being divided into a number of sub-bands (e.g., BW 1, BW 2, BW 3). These frequency resources may be specified on an RB-level, an RE-level, a PRB-level, or some other frequency width.

A first bit map 1002 specifies different bandwidths (BW 1, BW 2, BW 3) to be used for UL signaling and DL signaling over a period of time. During a time instance 1004, the entirety of the bandwidth is designated for DL signaling. Here, the entirety of the bandwidth includes sub-band BW 1 (e.g., a specified number X of RBs), sub-band BW 2 (e.g., a specified number Y of RBs), and sub-band BW 3 (e.g., a specified number Z of RBs). During a time instance 1006, sub-bands BW 1 and BW 3 are designated for DL signaling, while sub-band BW 2 is designated for UL signaling. During a time instance 1008, the entirety of the bandwidth is designated for UL signaling.

A second bit map 1010 also specifies different bandwidths (BW 1, BW 2, BW 3) to be used for UL signaling and DL signaling over a period of time. In this case, during each time instance, sub-bands BW 1 and BW 3 are designated for DL signaling, while sub-band BW 2 is designated for UL signaling.

A third bit map 1012 also specifies different bandwidths (BW 1, BW 2) to be used for UL signaling and DL signaling over a period of time. In this case, during each time instance, sub-band BW 1 is designated for DL signaling, while sub-band BW 2 is designated for UL signaling.

The switching can be periodic or non-periodic within the pattern of the bit map. In some examples, the bit map may be applied periodically (e.g., every ten slots, every 5 ms, etc.). In some examples, the bit map may be applied when configured or activated. In some examples, a network entity may specify that a particular bit map is to be used for a certain period of time or a certain number of symbols or slots.

In some examples, RRC messaging may be used to pre-configure one or more bit-map switching patterns. In this case, a network entity may indicate which one of the patterns is to be used at a given time (e.g., the next N ms time window). In some examples, an RRC configuration may define multiple patterns, and a MAC-CE can be used to activate one pattern and subsequently deactivate the pattern. In some examples, an RRC configuration may define multiple patterns, and a DCI can be used to indicate a selection of one pattern to use (e.g., within the next N slots). In some examples, a MAC-CE may be used to specify a particular pattern.

In some examples, a bit map may be used to indicate one or more bandwidth configurations to be used by a UE over a period of time. For example, a UE may initially be configured with several bit map configurations. Subsequently, a network entity may send a configuration bit map to the UE indicting that one or more of these bit map configurations are to be used (e.g., over a period of time).

Figure 11:
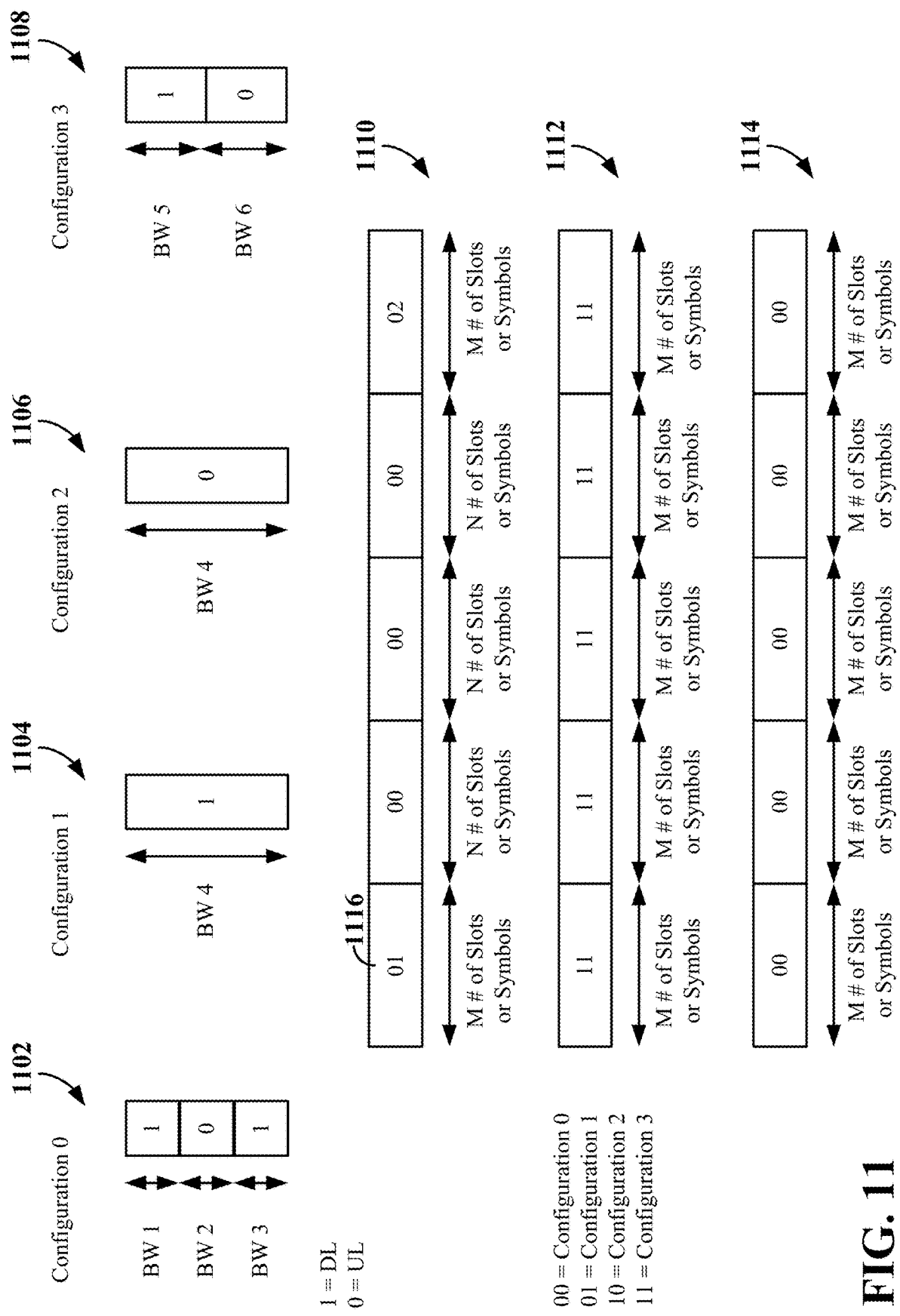
FIG. 11 is a conceptual illustration of different examples of resource configurations according to some aspects.

FIG. 11 illustrates several examples of bit map configurations and configuration signaling that may be used to indicate a bandwidth switch. Other bit map patterns and configurations may be used in other examples. In these examples, a bit value of 1 indicates a DL resource and a bit value of 0 indicates an UL resource. Other types of resources (e.g., flexible resources, etc.) may be indicated in other examples. Also, in these examples, each time instance indicated by the bit map may correspond to a single symbol, a specified number of symbols, a single slot, a specified number of slots, or some other time duration. In addition, in these examples, the allocated bandwidth is indicated as potentially being divided into a number of sub-bands (e.g., BW 1, BW 2, BW 3). These frequency resources may be specified on an RB-level, an RE-level, a PRB-level, or some other frequency width.

In the example of FIG. 11, a UE (not shown) is configured with four configurations 1102, 1104, 1106, and 1108. Other configurations may be used in other examples. A first configuration 1102 specifies that sub-bands BW 1 and BW 3 are designated for DL signaling, while sub-band BW 2 is designated for UL signaling. A second configuration 1104 specifies that the entirely of the bandwidth BW 4 is designated for DL signaling. A third configuration 1106 specifies that the entirely of the bandwidth BW 4 is designated for UL signaling. A fourth configuration 1108 specifies that sub-band BW 5 is designated for DL signaling, while sub-band BW 6 is designated for UL signaling.

The example of FIG. 11 also illustrates three examples of 1110, 1112, and 1114 of how a network entity may indicate to a UE which of the configurations 1102, 1104, 1106, and 1108 are to be used (e.g., for a particular period of time, for a certain periodicity, etc.). As shown in FIG. 11, the examples of 1110, 1112, and 1114 may take the form of bit maps that a network entity may signal to a UE.

The first example 1110 illustrates a bit map that specifies that the second configuration 1104 is to be used during a first time period 1116 (e.g., a specified number M of symbols, slots, etc.). The bit map of the first example 1110 also specifies that the first configuration 1102 is to be used during the next three time periods (e.g., each having a specified number N of symbols, slots, etc.). In addition, the bit map of the first example 1110 specifies that the third configuration 1106 is to be used during the last period (e.g., a specified number M of symbols, slots, etc.). Different time periods may be used in other examples.

The second example 1112 illustrates a bit map that specifies that the third configuration 1108 is to be used during each of a set of time periods. In this example, each time period may correspond to a specified number M of symbols, slots, etc. Different time periods may be used in other examples.

The third example 1114 illustrates a bit map that specifies that the first configuration 1102 is to be used during each of a set of time periods. In this example, each time period may correspond to a specified number M of symbols, slots, etc. Different time periods may be used in other examples.

In some examples, a network entity might configure one RS configuration for both the half-duplex and SBFD resources. In this case, a defined rule (e.g., specified by a wireless communication standard such as a 3GPP technical specification) may be configured in the UE so that the UE adaptively alters the bandwidth for transmitting and/or receiving the RS based on the RS configuration, thereby saving signaling overhead. Here, once a UE receives information regarding a resource allocation (e.g., the UE determines that certain symbols are SBFD symbols), the UE may automatically switch its bandwidth accordingly.

For example, during full-duplex resources/symbols of a UE's serving gNB or a neighbor gNB, to avoid receiving/transmitting interference from UL bandwidth to DL bandwidth from/to its serving gNB or neighbor gNB, a UE may follow the sub-band configuration in the RS configuration to switch the RS to occupy reduced DL bandwidth/sub-band in full-duplex resources. In half duplex resources, the UE may switch back to a wider bandwidth (e.g., the whole band for the DL RS). The switching can be periodic or non-periodic according to the half-duplex and full-duplex resources. This approach is also applicable to periodic traffic (e.g., SPS, CG, or SRS).

Figure 12:
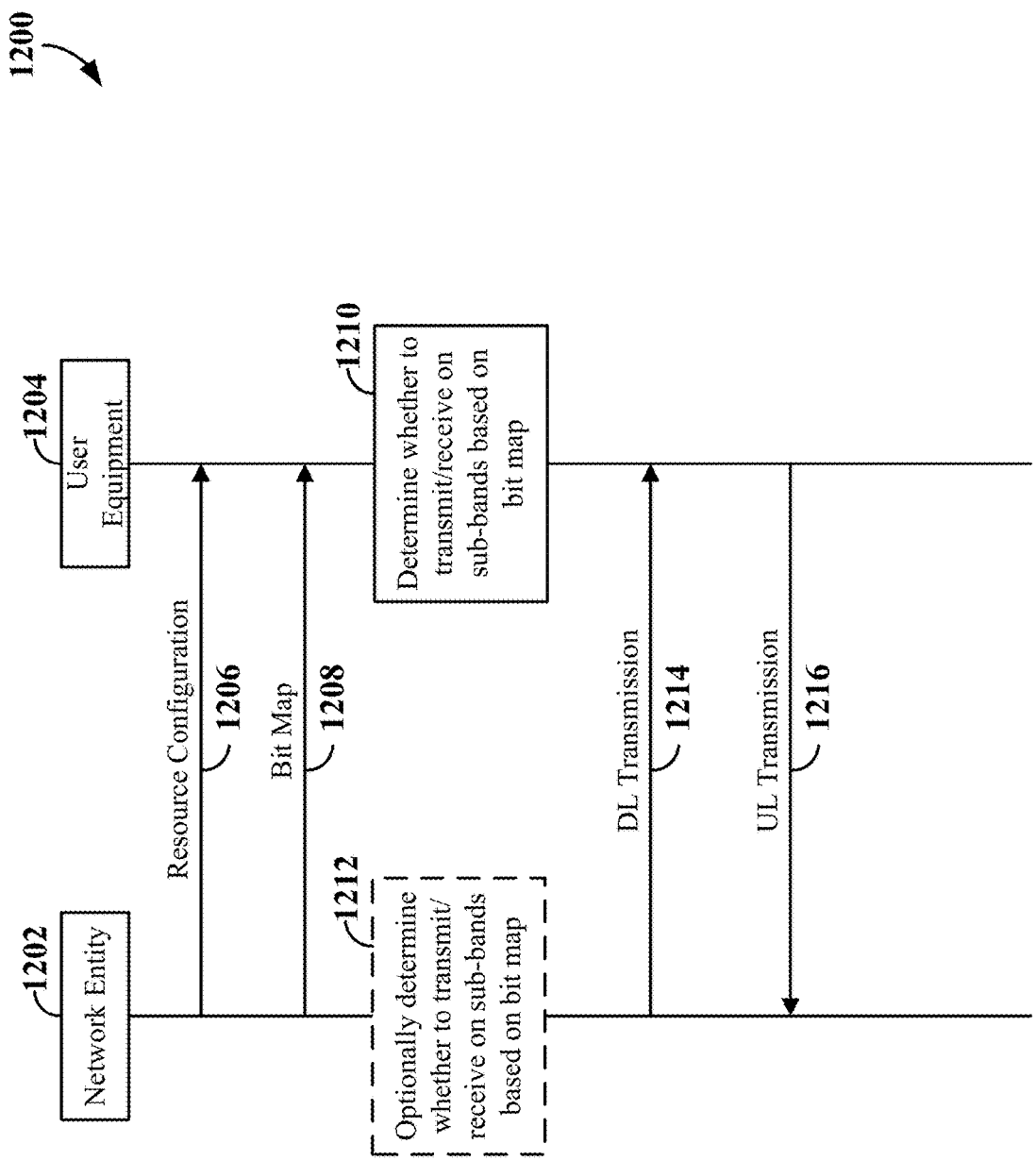
FIG. 12 is a signaling diagram illustrating an example of bit map-based resource usage according to some aspects.

FIG. 12 is a signaling diagram 1200 illustrating an example of a wireless communication system including a network entity 1202 and a user equipment 1204. In some examples, the network entity 1202 may correspond to any of the network entities, base stations, CUs, DUs, RUs, or scheduling entities shown in any of FIGS. 1, 2, 3, 5, 7, 8A, 9, 13, 14, and 19. In some examples, the user equipment 1204 may correspond to any of the UEs, or scheduled entities shown in any of FIGS. 1, 2, 3, 5, 7, 9, 13, 14, and 15.

At #1206 of FIG. 12, the network entity 1202 sends a resource configuration to the user equipment 1204. In some examples, the resource configuration may be an RS configuration.

At #1208, the network entity 1202 sends a bit map to the user equipment 1204. In some examples, the bit map may specify the sub-band resources, per symbol or slot, to be used for full-duplex communication. For example, the bit map may indicate which sub-bands are used for UL and which sub-bands are used for DL in a given symbol or slot.

At #1210, the user equipment 1204 may determine whether to transmit or receive on certain sub-bands during a particular slot or symbol. For example, the user equipment 1204 may refrain from receiving on a sub-band that is subject to interference (e.g., CLI or SI).

At optional #1212, the network entity 1202 may determine whether to transmit or receive on certain sub-bands during a particular slot or symbol. For example, the network entity 1202 may refrain from receiving on a sub-band that is subject to interference (e.g., CLI or SI).

At #1214, the network entity 1202 conducts transmissions and the user equipment 1204 conducts receptions according to the bit map, as applicable. Similarly, at #1216, the user equipment 1204 conducts transmissions and the network entity 1202 conducts receptions according to the bit map, as applicable.

Figure 13:
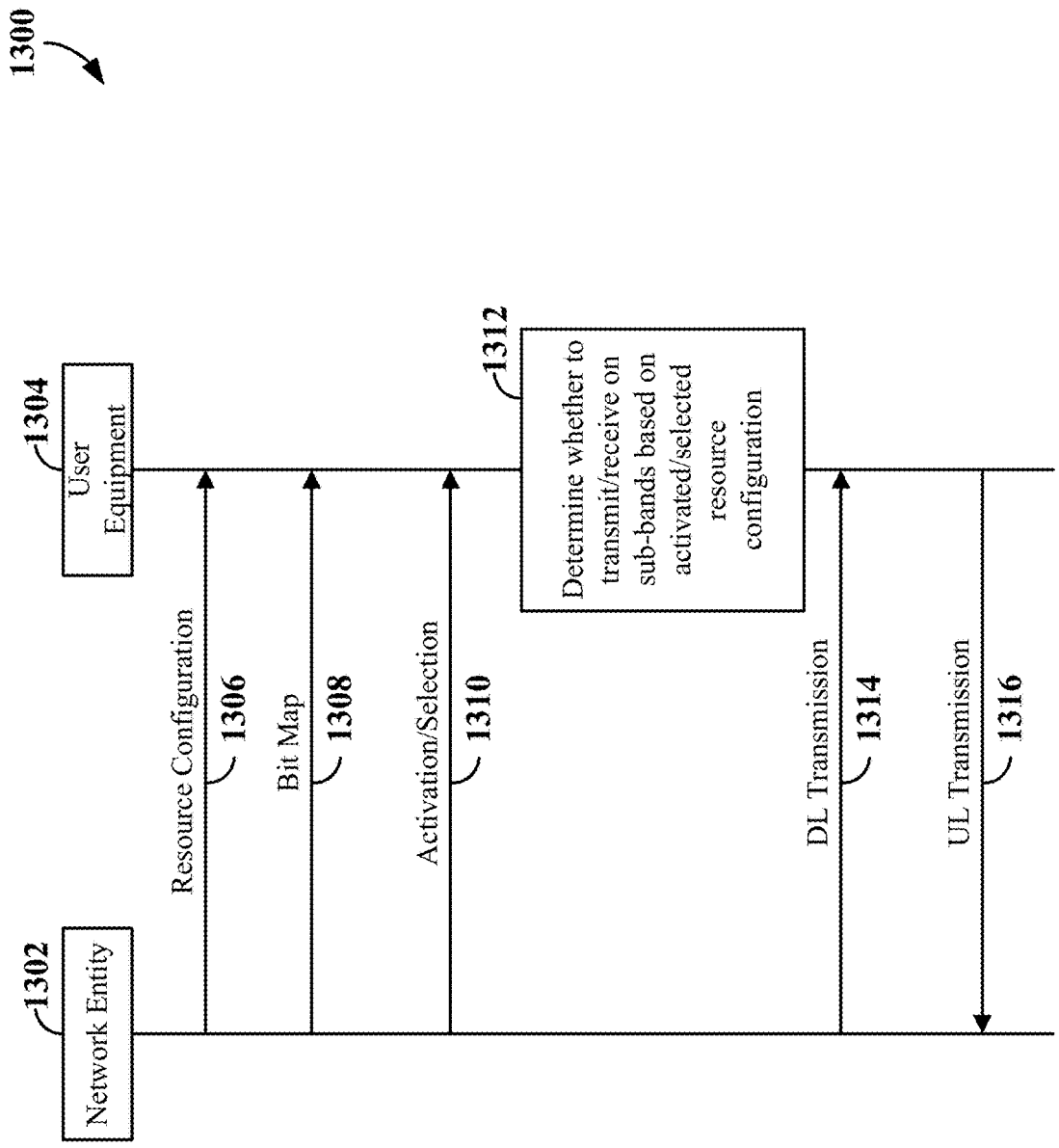
FIG. 13 is a signaling diagram illustrating an example of resource configuration activation and/or selection according to some aspects.

FIG. 13 is a signaling diagram 1300 illustrating an example of a wireless communication system including a network entity 1302 and a user equipment 1304. In some examples, the network entity 1302 may correspond to any of the network entities, base stations, CUs, DUs, RUs, or scheduling entities shown in any of FIGS. 1, 2, 3, 5, 7, 8A, 9, 12, 14, and 19. In some examples, the user equipment 1304 may correspond to any of the UEs, or scheduled entities shown in any of FIGS. 1, 2, 3, 5, 7, 9, 12, 14, and 15.

At #1306 of FIG. 13, the network entity 1302 sends a resource configuration to the user equipment 1304. In some examples, the resource configuration may include an RS configuration.

At #1308, the network entity 1302 sends an indication of multiple bit maps to the user equipment 1304. In some examples, each bit map may specify the sub-band resources, per symbol or slot, to be used for full duplex communication. For example, a bit map may indicate which sub-bands are used for UL and which sub-bands are used for DL in a given symbol or slot.

At #1310, the network entity 1302 may send a message to activate a particular bit map or indicate a selected bit map (e.g., for a period of time). For example, the network entity 1302 may send a MAC-CE to activate a particular bit map. In this case, the network entity 1302 may later send another MAC-CE to deactivate that bit map. In another example, the network entity 1302 may send a DCI that indicates that a particular bit map is to be used (e.g., for a specified number of slots).

At #1312, the user equipment 1304 may determine whether to transmit or receive on certain sub-bands during a particular slot or symbol based on the indicated bit map. For example, the user equipment 1304 may refrain from receiving on a sub-band that is subject to interference (e.g., CLI or SI).

At #1314, the network entity 1302 conducts transmissions and the user equipment 1304 conducts receptions according to the bit map, as applicable. Similarly, at #1316, the user equipment 1304 conducts transmissions and the network entity 1302 conducts receptions according to the bit map, as applicable.

Figure 14:
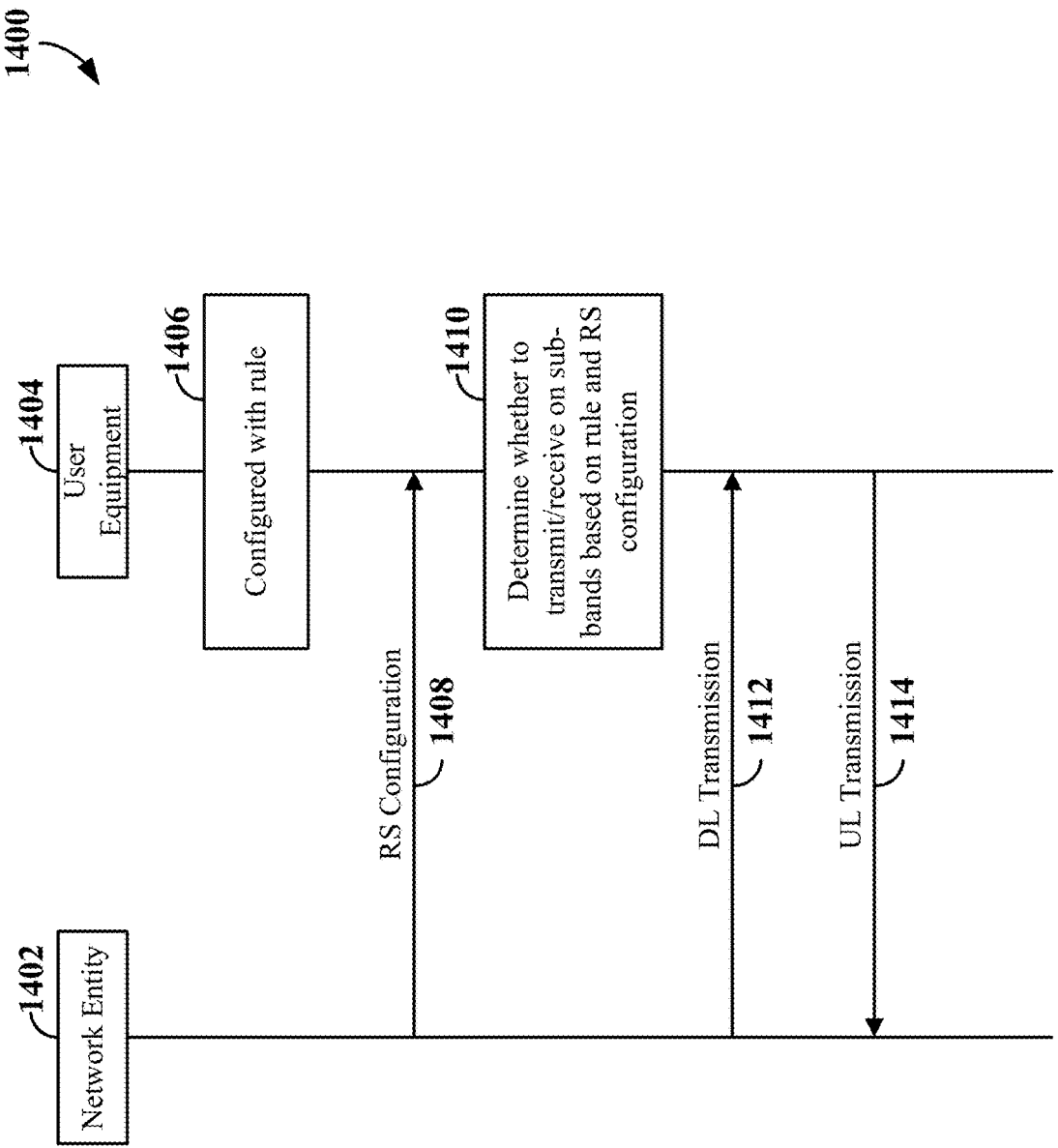
FIG. 14 is a signaling diagram illustrating an example of rule-based resource usage according to some aspects.

FIG. 14 is a signaling diagram 1400 illustrating an example of a wireless communication system including a network entity 1402 and a user equipment 1404. In some examples, the network entity 1402 may correspond to any of the network entities, base stations, CUs, DUs, RUs, or scheduling entities shown in any of FIGS. 1, 2, 3, 5, 7, 8A, 9, 12, 13, and 19. In some examples, the user equipment 1404 may correspond to any of the UEs, or scheduled entities shown in any of FIGS. 1, 2, 3, 5, 7, 9, 12, 13, and 15.

At #1406 of FIG. 14, the user equipment 1404 is configured with a rule that specified specifies that the UE is to use an RS configuration to determine which sub-bands may be used (for reduced sub-band operation).

At #1408, the network entity 1402 sends a resource configuration to the user equipment 1404. In some examples, the resource configuration may be an RS configuration.

At #1410, the user equipment 1404 may determine whether to transmit or receive on certain sub-bands during a particular slot or symbol based on the configuration received at #1408. For example, the user equipment 1404 may refrain from receiving on a sub-band that is subject to interference (e.g., CLI or SI).

At #1412, the network entity 1402 conducts transmissions and the user equipment 1404 conducts receptions according to the bit map, as applicable. Similarly, at #1414, the user equipment 1404 conducts transmissions and the network entity 1402 conducts receptions according to the bit map, as applicable.

Figure 15:
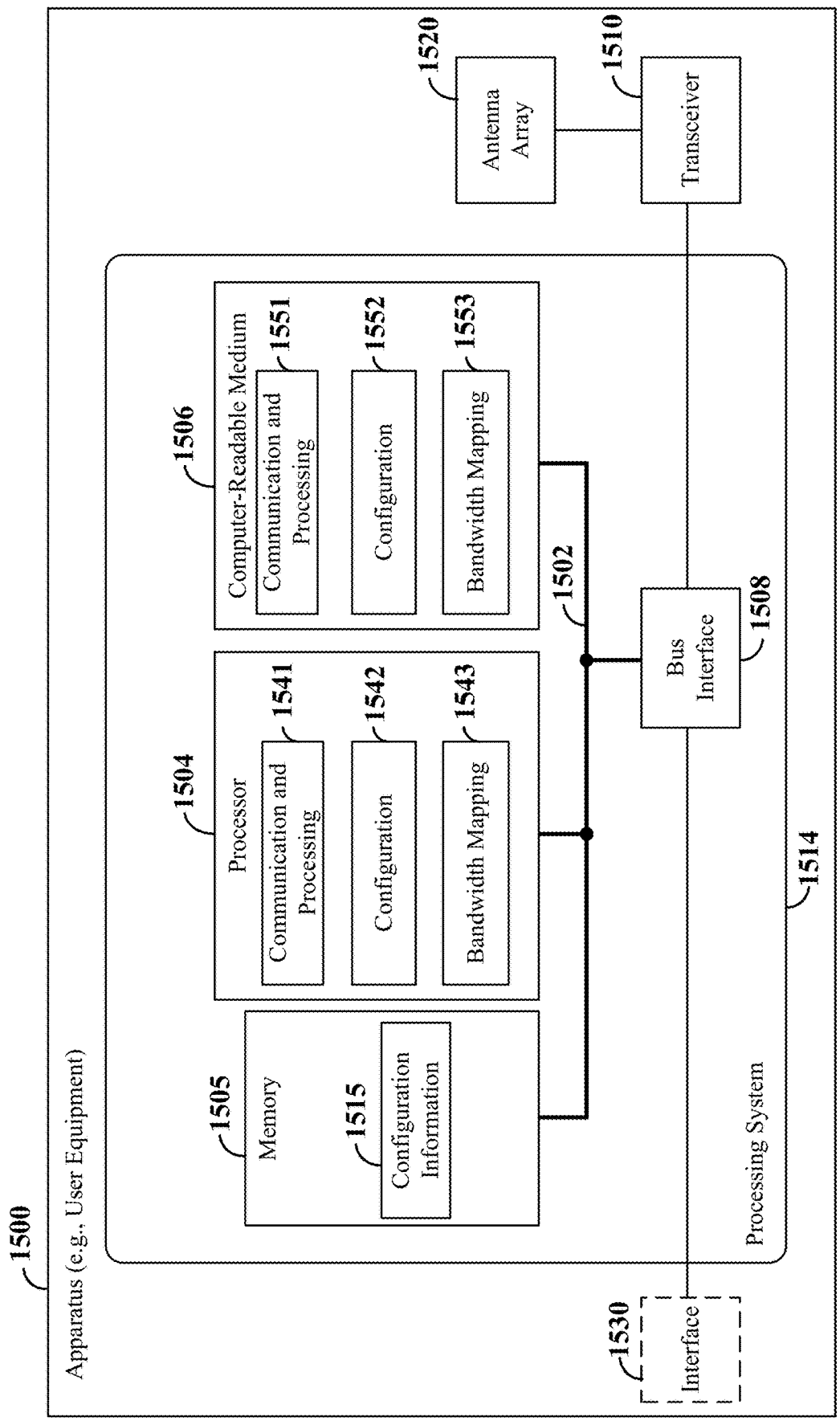
FIG. 15 is a block diagram conceptually illustrating an example of a hardware implementation for an apparatus (e.g., a user equipment) employing a processing system according to some aspects.

FIG. 15 is a block diagram illustrating an example of a hardware implementation for an apparatus 1500 employing a processing system 1514. For example, the apparatus 1500 may be a device configured to wirelessly communicate in a network as discussed in any one or more of FIGS. 1-14. In some implementations, the apparatus 1500 may correspond to any of the UEs, or scheduled entities shown in any of FIGS. 1, 2, 3, 5, 7, 8A, 9, 12, 13, and 14.

In accordance with various aspects of the disclosure, an element, or any portion of an element, or any combination of elements may be implemented with the processing system 1514. The processing system 1514 may include one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1500 may be configured to perform any one or more of the functions described herein. That is, the processor 1504, as utilized in an apparatus 1500, may be used to implement any one or more of the processes and procedures described herein.

The processor 1504 may in some instances be implemented via a baseband or modem chip and in other implementations, the processor 1504 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502, a transceiver 1510 and an antenna array 1520 and between the bus 1502 and an interface 1530. The transceiver 1510 provides a communication interface or means for communicating with various other apparatus over a wireless transmission medium. The interface 1530 provides a communication interface or means of communicating with various other apparatuses and devices (e.g., other devices housed within the same apparatus as the apparatus 1500 or other external apparatuses) over an internal bus or external transmission medium, such as an Ethernet cable. Depending upon the nature of the apparatus, the interface 1530 may include a user interface (e.g., keypad, display, speaker, microphone, joystick). Of course, such a user interface is optional, and may be omitted in some examples, such as an IoT device.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software. For example, the memory 1505 may store configuration information 1515 (e.g., resource configuration information) used by the processor 1504 for the communication operations described herein.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1500 may be configured to perform any one or more of the operations described herein (e.g., as described above in conjunction with FIGS. 1-14 and as described below in conjunction with FIGS. 16-18). In some aspects of the disclosure, the processor 1504, as utilized in the apparatus 1500, may include circuitry configured for various functions.

In some aspects of the disclosure, the processor 1504 may include communication and processing circuitry 1541. The communication and processing circuitry 1541 may be configured to communicate with a network entity, such as a gNB. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

In some implementations where the communication involves receiving information, the communication and processing circuitry 1541 may obtain information from a component of the apparatus 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may receive one or more of signals, messages, SCIs, feedback, other information, or any combination thereof. In some examples, the communication and processing circuitry 1541 may receive information via one or more of a PSCCH, a PSSCH, a PSFCH, some other type of channel, or any combination thereof. In some examples, the communication and processing circuitry 1541 may include functionality for a means for decoding. In some examples, the communication and processing circuitry 1541 may include functionality for a means for obtaining signaling. In some examples, the communication and processing circuitry 1541 and/or the transceiver 1510 may include functionality for a means for receiving.

In some implementations where the communication involves sending (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may send one or more of signals, messages, SCIs, feedback, other information, or any combination thereof. In some examples, the communication and processing circuitry 1541 may send information via one or more of a PSCCH, a PSSCH, a PSFCH, some other type of channel, or any combination thereof. In some examples, the communication and processing circuitry 1541 may include functionality for a means for encoding. In some examples, the communication and processing circuitry 1541 may include functionality for a means for outputting signaling. In some examples, the communication and processing circuitry 1541 and/or the transceiver 1510 may include functionality for a means for transmitting.

The processor 1504 may include configuration circuitry 1542 configured to perform configuration-related operations as discussed herein (e.g., one or more of the operations described above in conjunction with FIGS. 10-14). The configuration circuitry 1542 may be configured to execute configuration software 1552 included on the computer-readable medium 1506 to implement one or more functions described herein.

The configuration circuitry 1542 may include functionality for a means for obtaining a bit map (e.g., as described above in conjunction with FIGS. 10-14). For example, the configuration circuitry 1542 may receive an RRC message or a MAC-CE including the bit map from a network entity via a PDSCH.

The configuration circuitry 1542 may include functionality for a means for obtaining a resource configuration (e.g., as described above in conjunction with FIGS. 10-14). For example, the configuration circuitry 1542 may receive, from a network entity via a PDSCH, an RRC message that specifies a half-duplex resource assignment and/or a SBFD resource assignment.

The configuration circuitry 1542 may include functionality for a means for obtaining a message (e.g., as described above in conjunction with FIGS. 10-14). For example, the configuration circuitry 1542 may receive a message that indicates that a bit map is activated or selected.

The configuration circuitry 1542 may include functionality for a means for obtaining a MAC-CE (e.g., as described above in conjunction with FIGS. 10-14). For example, the configuration circuitry 1542 may receive a MAC-CE that indicates that a bit map is activated or deactivated.

The configuration circuitry 1542 may include functionality for a means for obtaining a DCI (e.g., as described above in conjunction with FIGS. 10-14). For example, the configuration circuitry 1542 may receive a DCI via a PDCCH that indicates that a bit map is selected.

The configuration circuitry 1542 may include functionality for a means for obtaining a rule (e.g., as described above in conjunction with FIGS. 10-14). For example, the configuration circuitry 1542 may receive an RRC message via a PDSCH that indicates a defined resource allocation rule.

The processor 1504 may include bandwidth mapping circuitry 1543 configured to perform bandwidth mapping-related operations as discussed herein (e.g., one or more of the operations described above in conjunction with FIGS. 10-14). The bandwidth mapping circuitry 1543 may be configured to execute bandwidth mapping software 1553 included on the computer-readable medium 1506 to implement one or more functions described herein.

The bandwidth mapping circuitry 1543 may include functionality for a means for obtaining signaling (e.g., as described above in conjunction with FIGS. 10-14). For example, the bandwidth mapping circuitry 1543 may facilitate obtaining DL signaling on at least one sub-band. As another example, the bandwidth mapping circuitry 1543 may facilitate obtaining signaling on at least one sub-band based on a defined rule.

The bandwidth mapping circuitry 1543 may include functionality for a means for outputting signaling (e.g., as described above in conjunction with FIGS. 10-14). For example, the bandwidth mapping circuitry 1543 may facilitate outputting UL signaling on at least one sub-band. As another example, the bandwidth mapping circuitry 1543 may facilitate outputting signaling on at least one sub-band based on a defined rule.

Figure 16:
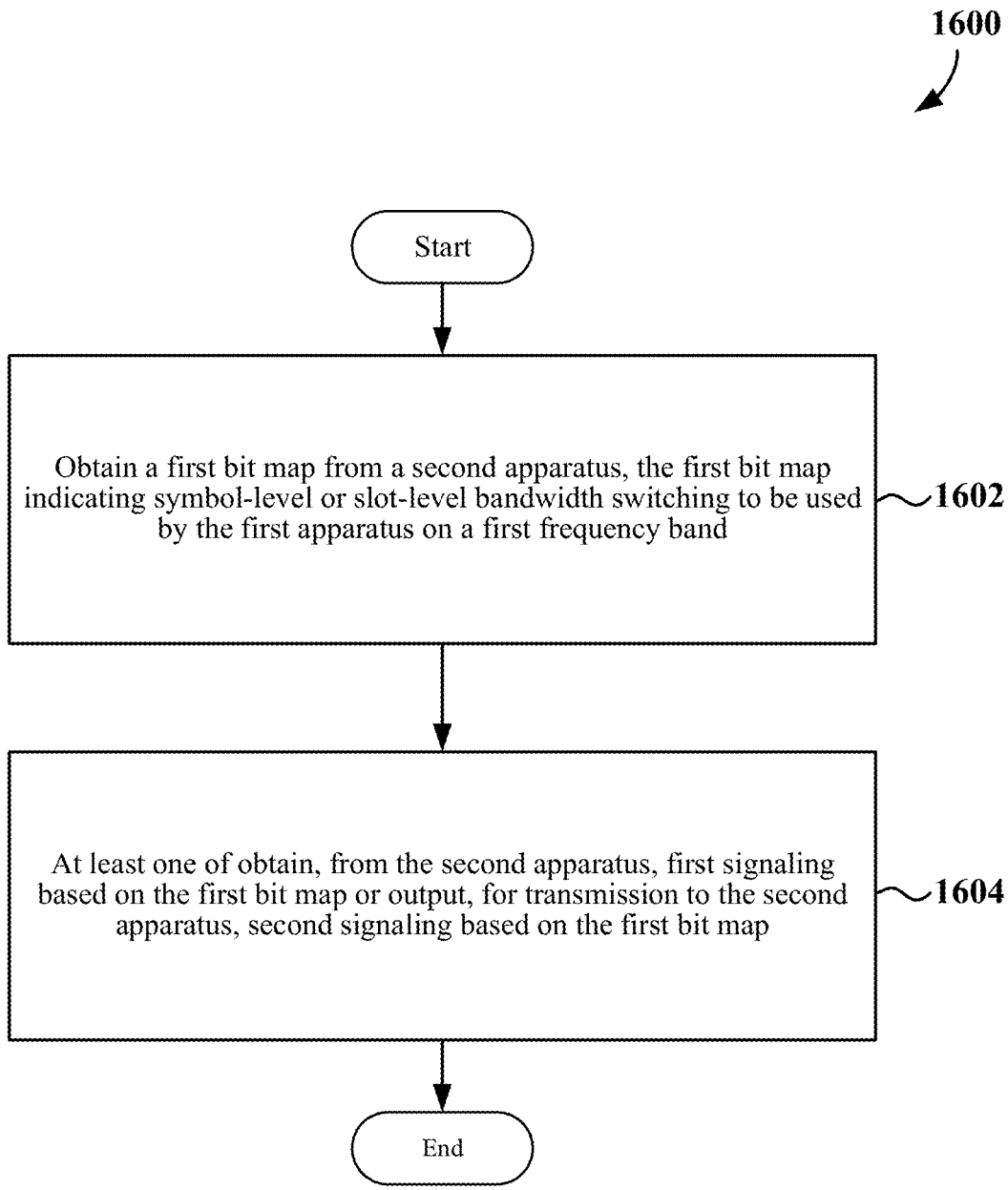
FIG. 16 is a flow chart illustrating an example communication method involving communicating based on a bit map according to some aspects.

FIG. 16 is a flow chart illustrating an example method 1600 for communication in accordance with some aspects of the present disclosure. As described below, some or all illustrated features may be omitted in a particular implementation within the scope of the present disclosure, and some illustrated features may not be required for implementation of all examples. In some examples, the method 1600 may be carried out by the apparatus 1500 illustrated in FIG. 15. In some examples, the method 1600 may be carried out by any suitable apparatus or means for carrying out the functions or algorithm described below.

At block 1602, a first apparatus may obtain a first bit map from a second apparatus, the first bit map indicating symbol-level or slot-level bandwidth switching to be used by the first apparatus on a first frequency band. In some examples, the configuration circuitry 1542, shown and described in FIG. 15, may provide a means to obtain a first bit map from a second apparatus, the first bit map indicating symbol-level or slot-level bandwidth switching to be used by the first apparatus on a first frequency band. In some examples, the configuration circuitry 1542 together with the communication and processing circuitry 1541 and the transceiver 1510, shown and described in FIG. 15, may provide a means to obtain a first bit map from a second apparatus, the first bit map indicating symbol-level or slot-level bandwidth switching to be used by the first apparatus on a first frequency band.

At block 1604, the first apparatus may at least one of obtain, from the second apparatus, first signaling based on the first bit map or output, for transmission to the second apparatus, second signaling based on the first bit map. In some examples, the bandwidth mapping circuitry 1543, shown and described in FIG. 15, may provide a means to at least one of obtain, from the second apparatus, first signaling based on the first bit map or output, for transmission to the second apparatus, second signaling based on the first bit map. In some examples, the bandwidth mapping circuitry 1543 together with the communication and processing circuitry 1541 and the transceiver 1510, shown and described in FIG. 15, may provide a means to at least one of obtain, from the second apparatus, first signaling based on the first bit map or output, for transmission to the second apparatus, second signaling based on the first bit map.

In some examples, the first bit map further indicates a switch between a first bandwidth for a half-duplex resource assignment and a second bandwidth for a base station full-duplex resource assignment. In some examples, the base station full-duplex resource assignment may include an uplink resource assignment on a first sub-band of the first frequency band for a first user equipment, a first downlink resource assignment on a second sub-band of the first frequency band for a second user equipment, and a second downlink resource assignment on a third sub-band of the first frequency band for the second user equipment. For example, a DL sub-band may be assigned for UE 1 and an UL sub-band may be assigned for UE 2, where full-duplex is from a network entity and each UE is a half-duplex UE that will do either DL or UL at a time based on the assignment. In some examples, the base station full-duplex resource assignment may include an uplink resource assignment on a first sub-band of the first frequency band for a first user equipment, and a first downlink resource assignment on a second sub-band of the first frequency band for a second user equipment.

In some examples, the first bit map may include a first value indicating a half-duplex sub-band of the first frequency band. In some examples, the first bit map may include a second value indicating a downlink or uplink sub-band full-duplex sub-band of the first frequency band.

In some examples, the first bit map may include a first bandwidth assignment for a first time period. In some examples, the first bit map may include a second bandwidth assignment for a second time period.

In some examples, the first apparatus may, prior to obtaining the first bit map, obtain a half-duplex resource configuration that specifies that the first apparatus is to use a half-duplex bandwidth resource assignment during a first time period. In some examples, the first bit map specifies that the first apparatus is to use a full-duplex bandwidth resource assignment instead of the half-duplex bandwidth resource assignment during the first time period.

In some examples, the first apparatus may obtain a first resource configuration and a second resource configuration. In some examples, a first subset of bits of the first bit map associated with a first subset of symbols or slots specifies, for each of a first set of resources, that the first apparatus is to use the first resource configuration. In some examples, a second subset of bits of the first bit map associated with a second subset of symbols or slots specifies, for each of a second set of resources, that the first apparatus is to use the second resource configuration.

In some examples, the first resource configuration is associated with a first frequency bandwidth. In some examples, the second resource configuration is associated with a second frequency bandwidth that is different from the first frequency bandwidth.

In some examples, the first signaling may include a downlink reference signal or other downlink signal. In some examples, the second signaling may include an uplink reference signal or other uplink signal.

In some examples, switching between different bandwidth resource assignments can be periodic or non-periodic within a bit map pattern. For example, the bit map may further indicate periodic switching between different bandwidth resource assignments or non-periodic switching between the different bandwidth resource assignments.

In some examples, the first apparatus may obtain a second bit map to be used by the first apparatus. In some examples, the first apparatus may obtain a message that indicates that the first bit map or the second bit map is active or selected for a period of time or for a quantity of time periods. In some examples, the first signaling is obtained during the period of time or the quantity of time periods. In some examples, the first apparatus may obtain an RRC message that preconfigures the first apparatus with a plurality of bit map switching patterns.

In some examples, the first apparatus may obtain a first medium access control-control element that activates the first bit map or the second bit map. In some examples, the first apparatus may obtain a second medium access control—control element that deactivates the first bit map or the second bit map. In some examples, the first apparatus may obtain a first medium access control-control element that indicates a bit map.

In some examples, the first apparatus may obtain downlink control information that indicates a selection of the first bit map or the second bit map. In some examples, the downlink control information further indicates that the selection of the first bit map or the second bit map applies for a defined quantity of time slots.

In some examples, the second signaling may include semi-persistent signaling. In some examples, the second signaling may include configured grant signaling. In some examples, the second signaling may include sounding reference signaling.

Figure 17:
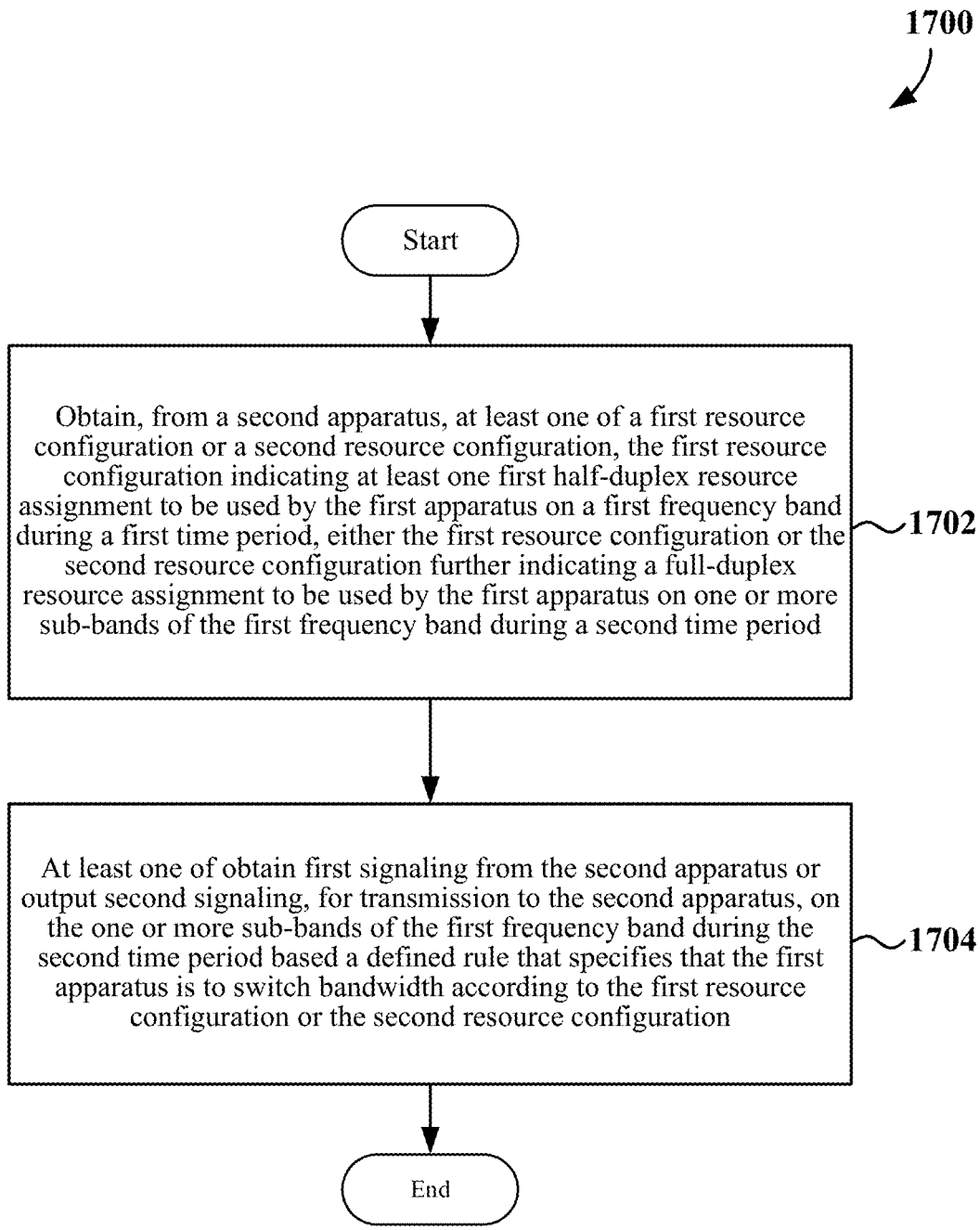
FIG. 17 is a flow chart illustrating an example communication method involving communicating based on a defined rule according to some aspects.

FIG. 17 is a flow chart illustrating an example method 1700 for communication in accordance with some aspects of the present disclosure. As described below, some or all illustrated features may be omitted in a particular implementation within the scope of the present disclosure, and some illustrated features may not be required for implementation of all examples. In some examples, the method 1700 may be carried out by the apparatus 1500 illustrated in FIG. 15. In some examples, the method 1700 may be carried out by any suitable apparatus or means for carrying out the functions or algorithm described below.

At block 1702, a first apparatus may obtain, from a second apparatus, at least one of a first resource configuration or a second resource configuration, the first resource configuration indicating at least one first half-duplex resource assignment to be used by the first apparatus on a first frequency band during a first time period, either the first resource configuration or the second resource configuration further indicating a full-duplex resource assignment to be used by the first apparatus on one or more sub-bands of the first frequency band during a second time period. In some examples, the bandwidth mapping circuitry 1543, shown and described in FIG. 15, may provide a means to obtain, from a second apparatus, at least one of a first resource configuration or a second resource configuration. In some examples, the bandwidth mapping circuitry 1543 together with the communication and processing circuitry 1541 and the transceiver 1510, shown and described in FIG. 15, may provide a means to obtain, from a second apparatus, at least one of a first resource configuration or a second resource configuration.

At block 1704, the first apparatus may at least one of obtain first signaling from the second apparatus or output second signaling, for transmission to the second apparatus, on the one or more sub-bands of the first frequency band during the second time period based a defined rule that specifies that the first apparatus is to switch bandwidth according to the first resource configuration or the second resource configuration. In some examples, the bandwidth mapping circuitry 1543, shown and described in FIG. 15, may provide a means to at least one of obtain first signaling from the second apparatus or output second signaling, for transmission to the second apparatus, on the one or more sub-bands of the first frequency band during the second time period based a defined rule that specifies that the first apparatus is to switch bandwidth according to the first resource configuration or the second resource configuration. In some examples, the bandwidth mapping circuitry 1543 together with the communication and processing circuitry 1541 and the transceiver 1510, shown and described in FIG. 15, may provide a means to at least one of obtain first signaling from the second apparatus or output second signaling, for transmission to the second apparatus, on the one or more sub-bands of the first frequency band during the second time period based a defined rule that specifies that the first apparatus is to switch bandwidth according to the first resource configuration or the second resource configuration.

In some examples, the first apparatus may obtain, from the second apparatus, third signaling on an entirety of the first frequency band during the first time period based the defined rule.

In some examples, the first signaling may include a first downlink reference signal or other downlink signal. In some examples, the second signaling may include a second downlink reference signal or other downlink signal.

In some examples, the defined rule is specified by a wireless communication standard. In some examples, the first apparatus may obtain the defined rule from the second apparatus or a third apparatus.

In some examples, the first resource configuration is associated with a first frequency bandwidth. In some examples, the second resource configuration is associated with a second frequency bandwidth that is different from the first frequency bandwidth.

In some examples, the second signaling may include semi-persistent signaling. In some examples, the second signaling may include configured grant signaling. In some examples, the second signaling may include sounding reference signaling.

Figure 18:
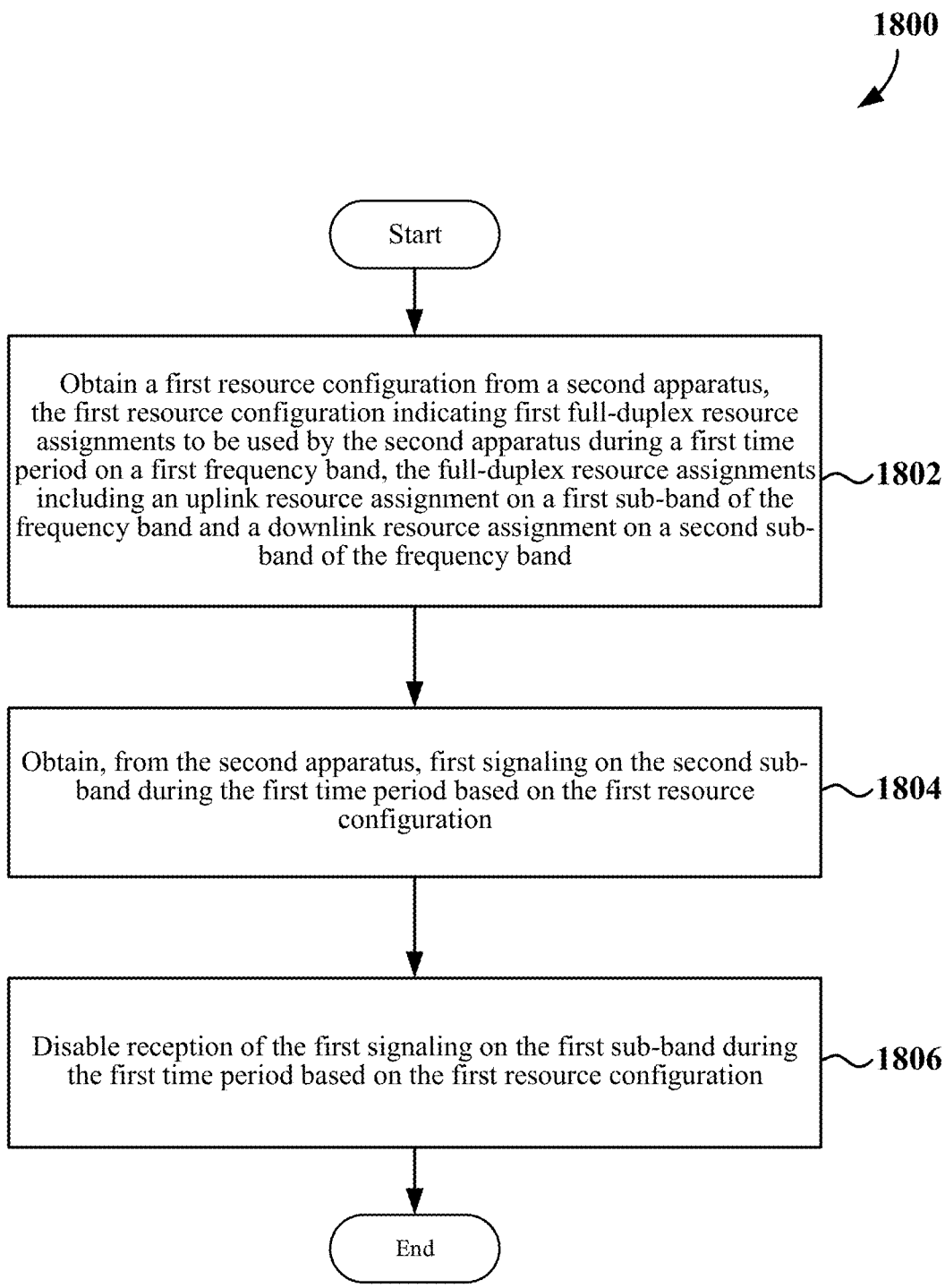
FIG. 18 is a flow chart illustrating an example communication method involving obtaining a resource configuration according to some aspects.

FIG. 18 is a flow chart illustrating an example method 1800 for communication in accordance with some aspects of the present disclosure. As described below, some or all illustrated features may be omitted in a particular implementation within the scope of the present disclosure, and some illustrated features may not be required for implementation of all examples. In some examples, the method 1800 may be carried out by the apparatus 1500 illustrated in FIG. 15. In some examples, the method 1800 may be carried out by any suitable apparatus or means for carrying out the functions or algorithm described below.

At block 1802, a first apparatus may obtain a first resource configuration from a second apparatus, the first resource configuration indicating full-duplex resource assignments to be used by the second apparatus during a first time period on a frequency band, the full-duplex resource assignments including an uplink resource assignment on a first sub-band of the frequency band and a downlink resource assignment on a second sub-band of the frequency band. In some examples, the configuration circuitry 1542, shown and described in FIG. 15, may provide a means to obtain a first resource configuration from a second apparatus, the first resource configuration indicating full-duplex resource assignments to be used by the second apparatus during a first time period on a frequency band, the full-duplex resource assignments including an uplink resource assignment on a first sub-band of the frequency band and a downlink resource assignment on a second sub-band of the frequency band. In some examples, the configuration circuitry 1542 together with the communication and processing circuitry 1541 and the transceiver 1510, shown and described in FIG. 15, may provide a means to obtain a first resource configuration from a second apparatus, the first resource configuration indicating full-duplex resource assignments to be used by the second apparatus during a first time period on a frequency band, the full-duplex resource assignments including an uplink resource assignment on a first sub-band of the frequency band and a downlink resource assignment on a second sub-band of the frequency band.

At block 1804, the first apparatus may obtain, from the second apparatus, first signaling on the second sub-band during the first time period based on the first resource configuration. In some examples, the bandwidth mapping circuitry 1543, shown and described in FIG. 15, may provide a means to obtain, from the second apparatus, first signaling on the second sub-band during the first time period based on the first resource configuration. In some examples, the bandwidth mapping circuitry 1543 together with the communication and processing circuitry 1541 and the transceiver 1510, shown and described in FIG. 15, may provide a means to obtain, from the second apparatus, first signaling on the second sub-band during the first time period based on the first resource configuration.

At block 1806, the first apparatus may disable reception of the first signaling on the first sub-band during the first time period based on the first resource configuration. In some examples, the bandwidth mapping circuitry 1543, shown and described in FIG. 15, may provide a means to disable reception of the first signaling on the first sub-band during the first time period based on the first resource configuration. In some examples, the bandwidth mapping circuitry 1543 together with the communication and processing circuitry 1541 and the transceiver 1510, shown and described in FIG. 15, may provide a means to disable reception of the first signaling on the first sub-band during the first time period based on the first resource configuration.

In some examples, the first signaling may include a downlink reference signal. In some examples, the first resource configuration identifies, for a plurality of time periods, half-duplex resources and full-duplex resources. In some examples, the time period is a time slot or an orthogonal frequency division multiplexing (OFDM) symbol period.

In some examples, the first apparatus may output second signaling for transmission on the first sub-band during a second time period based on the first resource configuration. In some examples, the first apparatus may disable transmission of the second signaling on the second sub-band during the second time period based on the first resource configuration; and the second signaling may include semi-persistent signaling, configured grant signaling, or sounding reference signaling.

In some examples, the first resource configuration specifies periodic full-duplex resource assignments. In some examples, the first resource configuration specifies non-periodic full-duplex resource assignments. In some examples, the first resource configuration may include a bit map.

In some examples, the obtaining of the first resource configuration may include obtaining a radio resource control (RRC) message that includes the first resource configuration. In some examples, the obtaining of the first resource configuration may include obtaining a radio resource control (RRC) message that includes the first resource configuration and at least one second resource configuration that indicates second full-duplex resource assignments to be used by the second apparatus during the first time period on the frequency band.

In some examples, the time period is a time slot or an orthogonal frequency division multiplexing (OFDM) symbol period. In some examples, the first apparatus may obtain a message that indicates that the first resource configuration or the second resource configuration is active for a period of time (e.g., 10 ms) or for a quantity of time periods (e.g., a number of slots).

In some examples, the first apparatus may obtain a medium access control-control element (MAC-CE) that activates the first resource configuration or the second resource configuration. In some examples, the first apparatus may obtain a medium access control-control element (MAC-CE) that deactivates the first resource configuration or the second resource configuration.

In some examples, the first apparatus may obtain downlink control information that indicates a selection of the first resource configuration or the second resource configuration. In some examples, the downlink control information further indicates that the selection of the first resource configuration or the second resource configuration applies for a defined quantity of time slots.

In some examples, the disabling of the reception of the first signaling on the first sub-band during the first time period is further based on a defined rule that specifies that the first apparatus is to alter transmit bandwidth and receive bandwidth based on the identified half-duplex resources and full-duplex resources.

In some examples, the first resource configuration further indicates a half-duplex resource assignment to be used by the second apparatus during a second time period on the frequency band; and the processing system is further configured to enable reception of third signaling on an entirety of the frequency band during the second time period based on the first resource configuration and the defined rule.

In some examples, the first apparatus includes a receiver configured to receive the first resource configuration and the first signaling, wherein the first apparatus is configured as a user equipment.

Referring again to FIG. 15, in one configuration, the apparatus 1500 includes means for obtaining a first bit map from a second apparatus, the first bit map indicating symbol-level or slot-level bandwidth switching to be used by the first apparatus on a first frequency band, and means for at least one of obtaining, from the second apparatus, first signaling based on the first bit map or outputting, for transmission to the second apparatus, second signaling based on the first bit map. In one configuration, the apparatus 1500 includes means for obtaining, from a second apparatus, at least one of a first resource configuration or a second resource configuration, the first resource configuration indicating at least one first half-duplex resource assignment to be used by the first apparatus on a first frequency band during a first time period, either the first resource configuration or the second resource configuration further indicating a full-duplex resource assignment to be used by the first apparatus on one or more sub-bands of the first frequency band during a second time period, and means for at least one of obtaining first signaling from the second apparatus or outputting second signaling, for transmission to the second apparatus, on the one or more sub-bands of the first frequency band during the second time period based a defined rule that specifies that the first apparatus is to switch bandwidth according to the first resource configuration or the second resource configuration. In one configuration, the apparatus 1500 includes means for obtaining a first resource configuration from a second apparatus, the first resource configuration indicating full-duplex resource assignments to be used by the second apparatus during a first time period on a frequency band, the full-duplex resource assignments including an uplink resource assignment on a first sub-band of the frequency band and a downlink resource assignment on a second sub-band of the frequency band, means for obtaining, from the second apparatus, first signaling on the second sub-band during the first time period based on the first resource configuration, and means for disabling reception of the first signaling on the first sub-band during the first time period based on the first resource configuration. In one aspect, the aforementioned means may be the processor 1504 shown in FIG. 15 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one or more of FIGS. 1, 2, 3, 7, 9, 12, 13, 14, and 15 and utilizing, for example, the methods and/or algorithms described herein in relation to FIGS. 16-18.

Figure 19:
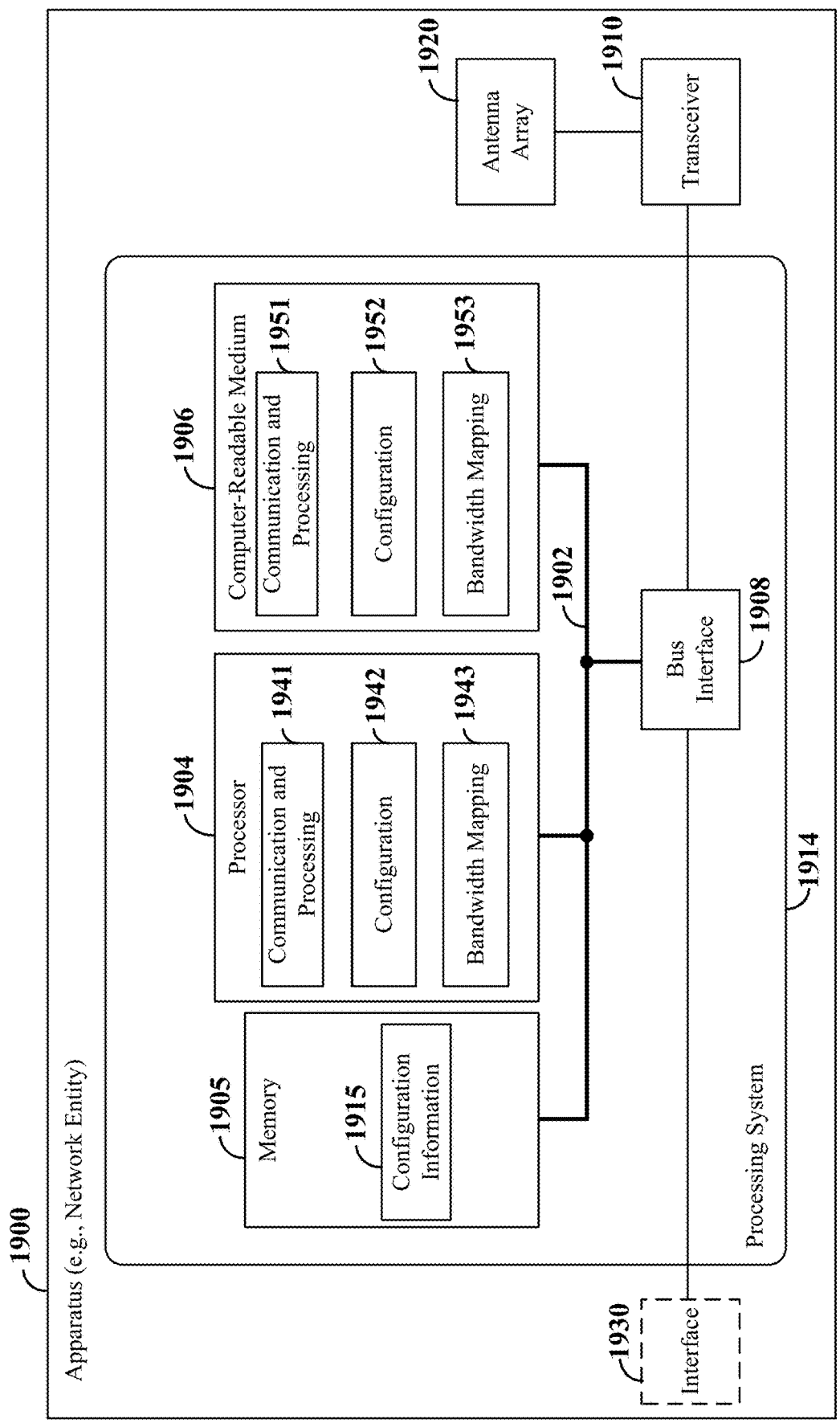
FIG. 19 is a block diagram conceptually illustrating an example of a hardware implementation for an apparatus (e.g., a network entity) employing a processing system according to some aspects.

FIG. 19 is a conceptual diagram illustrating an example of a hardware implementation for an apparatus 1900 employing a processing system 1914. In some implementations, the apparatus 1900 may correspond to any of the network entities, base stations, CUs, DUs, RUs, or scheduling entities shown in any of FIGS. 1, 2, 3, 5, 7, 8A, 9, 12, 13, and 14.

In accordance with various aspects of the disclosure, an element, or any portion of an element, or any combination of elements may be implemented with the processing system 1914. The processing system may include one or more processors 1904. The processing system 1914 may be substantially the same as the processing system 1514 illustrated in FIG. 15, including a bus interface 1908, a bus 1902, memory 1905, a processor 1904, a computer-readable medium 1906, a transceiver 1910, and an antenna array 1920. The memory 1905 may store configuration information 1915 (e.g., resource configuration information) used by the processor 1904 in cooperation with the transceiver 1910 for communication operations as described herein. Furthermore, the apparatus 1900 may include an interface 1930 (e.g., a network interface) that provides a means for communicating with at least one other apparatus within a core network and with at least one radio access network.

The apparatus 1900 may be configured to perform any one or more of the operations described herein (e.g., as described above in conjunction with FIG. 14 and as described below in conjunction with FIGS. 20-22). In some aspects of the disclosure, the processor 1904, as utilized in the apparatus 1900, may include circuitry configured for various functions.

The processor 1504 may be configured to generate, schedule, and modify a resource assignment or grant of time-frequency resources (e.g., a set of one or more resource elements). For example, the processor 1504 may schedule time—frequency resources within a plurality of time division duplex (TDD) and/or frequency division duplex (FDD) subframes, slots, and/or mini-slots to carry user data traffic and/or control information to and/or from multiple scheduled entities. The processor 1504 may be configured to schedule resources for the transmission of downlink signals. The processor 1504 may further be configured to schedule resources for the transmission of uplink signals.

In some aspects of the disclosure, the processor 1904 may include communication and processing circuitry 1941. The communication and processing circuitry 1941 may be configured to communicate with a user equipment. The communication and processing circuitry 1941 may include one or more hardware components that provide the physical structure that performs various processes related to communication (e.g., signal reception and/or signal transmission) as described herein. The communication and processing circuitry 1941 may further include one or more hardware components that provide the physical structure that performs various processes related to signal processing (e.g., processing a received signal and/or processing a signal for transmission) as described herein. The communication and processing circuitry 1941 may further be configured to execute communication and processing software 1951 included on the computer-readable medium 1906 to implement one or more functions described herein.

The communication and processing circuitry 1941 may further be configured to receive an indication from the UE. For example, the indication may be included in a MAC-CE carried in a Uu PUSCH, included in a Uu RRC message, or included in a dedicated Uu PUCCH or PUSCH. The communication and processing circuitry 1941 may further be configured to receive a scheduling request from a UE for an uplink grant or a sidelink grant.

In some implementations wherein the communication involves receiving information, the communication and processing circuitry 1941 may obtain information from a component of the apparatus 1900 (e.g., from the transceiver 1910 that receives the information via radio frequency signaling or some other type of signaling suitable for the applicable communication medium), process (e.g., decode) the information, and output the processed information. For example, the communication and processing circuitry 1941 may output the information to another component of the processor 1904, to the memory 1905, or to the bus interface 1908. In some examples, the communication and processing circuitry 1941 may receive one or more of signals, messages, other information, or any combination thereof. In some examples, the communication and processing circuitry 1941 may receive information via one or more channels. In some examples, the communication and processing circuitry 1941 may include functionality for a means for decoding. In some examples, the communication and processing circuitry 1941 may include functionality for a means for receiving signaling. In some examples, the communication and processing circuitry 1941 and/or the transceiver 1910 may include functionality for a means for receiving.

In some implementations wherein the communication involves sending (e.g., transmitting) information, the communication and processing circuitry 1941 may obtain information (e.g., from another component of the processor 1904, the memory 1905, or the bus interface 1908), process (e.g., encode) the information, and output the processed information. For example, the communication and processing circuitry 1941 may output the information to the transceiver 1910 (e.g., that transmits the information via radio frequency signaling or some other type of signaling suitable for the applicable communication medium). In some examples, the communication and processing circuitry 1941 may send one or more of signals, messages, other information, or any combination thereof. In some examples, the communication and processing circuitry 1941 may send information via one or more channels. In some examples, the communication and processing circuitry 1941 may include functionality for a means for encoding. In some examples, the communication and processing circuitry 1941 may include functionality for a means for outputting signaling. In some examples, the communication and processing circuitry 1941 and/or the transceiver 1910 may include functionality for a means for transmitting.

The processor 1904 may include configuration circuitry 1942 configured to perform configuration-related operations as discussed herein (e.g., one or more of the operations described above in conjunction with FIGS. 10-14). The configuration circuitry 1942 may be configured to execute configuration software 1952 included on the computer-readable medium 1906 to implement one or more functions described herein.

The configuration circuitry 1942 may include functionality for a means for outputting a bit map (e.g., as described above in conjunction with FIGS. 10-14). For example, the configuration circuitry 1942 may send an RRC message or a MAC-CE including the bit map to a UE via a PDSCH.

The configuration circuitry 1942 may include functionality for a means for outputting a resource configuration (e.g., as described above in conjunction with FIGS. 10-14). For example, the configuration circuitry 1942 may send, to a UE via a PDSCH, an RRC message that specifies a half-duplex resource assignment and/or a SBFD resource assignment.

The configuration circuitry 1942 may include functionality for a means for outputting a message (e.g., as described above in conjunction with FIGS. 10-14). For example, the configuration circuitry 1942 may send a message that indicates that a bit map is activated or selected.

The configuration circuitry 1942 may include functionality for a means for outputting a MAC-CE (e.g., as described above in conjunction with FIGS. 10-14). For example, the configuration circuitry 1942 may send a MAC-CE that indicates that a bit map is activated or deactivated.

The configuration circuitry 1942 may include functionality for a means for outputting a DCI (e.g., as described above in conjunction with FIGS. 10-14). For example, the configuration circuitry 1942 may send a DCI via a PDCCH that indicates that a bit map is selected.

The configuration circuitry 1942 may include functionality for a means for outputting a rule (e.g., as described above in conjunction with FIGS. 10-14). For example, the configuration circuitry 1942 may send an RRC message via a PDSCH that indicates a defined resource allocation rule.

The processor 1904 may include bandwidth mapping circuitry 1943 configured to perform bandwidth mapping-related operations as discussed herein (e.g., one or more of the operations described above in conjunction with FIGS. 10-14). The bandwidth mapping circuitry 1943 may be configured to execute bandwidth mapping software 1953 included on the computer-readable medium 1906 to implement one or more functions described herein.

The bandwidth mapping circuitry 1943 may include functionality for a means for obtaining signaling (e.g., as described above in conjunction with FIGS. 10-14). For example, the bandwidth mapping circuitry 1943 may facilitate obtaining UL signaling on at least one sub-band. As another example, the bandwidth mapping circuitry 1943 may facilitate obtaining signaling on at least one sub-band based on a defined rule.

The bandwidth mapping circuitry 1943 may include functionality for a means for outputting signaling (e.g., as described above in conjunction with FIGS. 10-14). For example, the bandwidth mapping circuitry 1943 may facilitate outputting DL signaling on at least one sub-band. As another example, the bandwidth mapping circuitry 1943 may facilitate outputting signaling on at least one sub-band based on a defined rule.

In some examples, the apparatus 1900 shown and described above in connection with FIG. 19 may be a disaggregated base station. For example, the apparatus 1900 shown in FIG. 19 may include the CU and optionally one or more DUs/RUs of the disaggregated base station. Other DUs/RUs associated with the apparatus 1900 may be distributed throughout the network. In some examples, the DUs/RUs may correspond to TRPs associated with the network entity. In some examples, the CU and/or DU/RU of the disaggregated base station (e.g., within the apparatus 1900) may generate at least one bit map or resource configuration and provide the at least one bit map or resource configuration to a user equipment.

Figure 20:
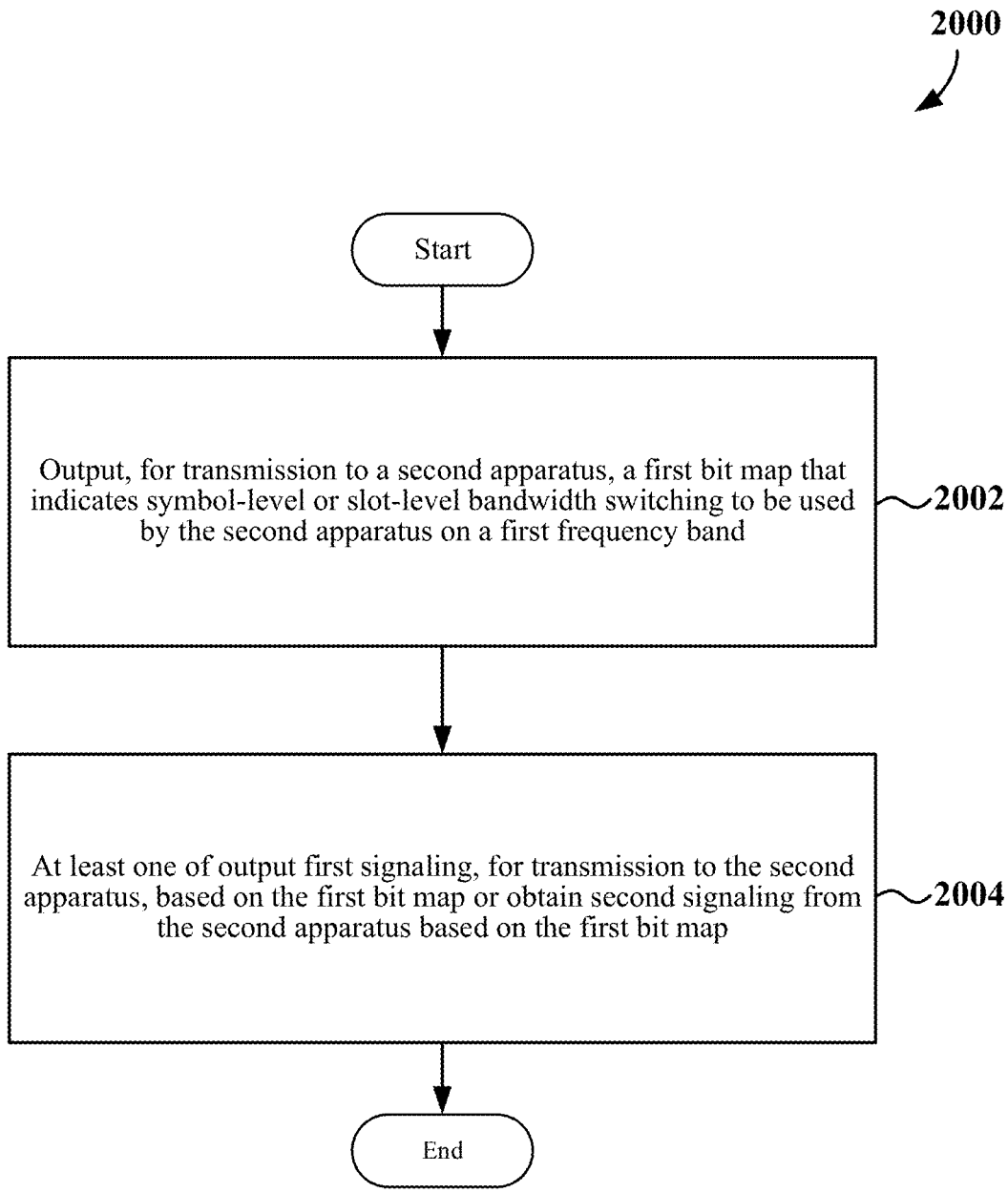
FIG. 20 is a flow chart illustrating an example communication method involving communicating based on a bit map according to some aspects.

FIG. 20 is a flow chart illustrating an example method 2000 for communication in accordance with some aspects of the present disclosure. As described below, some or all illustrated features may be omitted in a particular implementation within the scope of the present disclosure, and some illustrated features may not be required for implementation of all examples. In some examples, the method 2000 may be carried out by the apparatus 1900 illustrated in FIG. 19. In some examples, the method 2000 may be carried out by any suitable apparatus or means for carrying out the functions or algorithm described below.

At block 2002, a first apparatus may output, for transmission to a second apparatus, a first bit map that indicates symbol-level or slot-level bandwidth switching to be used by the second apparatus on a first frequency band. In some examples, the configuration circuitry 1942, shown and described in FIG. 19, may provide a means to output, for transmission to a second apparatus, a first bit map that indicates symbol-level or slot-level bandwidth switching to be used by the second apparatus on a first frequency band. In some examples, the configuration circuitry 1942 together with the communication and processing circuitry 1941 and the transceiver 1910, shown and described in FIG. 19, may provide a means to output, for transmission to a second apparatus, a first bit map that indicates symbol-level or slot-level bandwidth switching to be used by the second apparatus on a first frequency band.

At block 2004, the first apparatus may at least one of output first signaling, for transmission to the second apparatus, based on the first bit map or obtain second signaling, from the second apparatus based on the first bit map. In some examples, the bandwidth mapping circuitry 1943, shown and described in FIG. 19, may provide a means to at least one of output first signaling, for transmission to the second apparatus, based on the first bit map or obtain second signaling, from the second apparatus based on the first bit map. In some examples, the bandwidth mapping circuitry 1943 together with the communication and processing circuitry 1941 and the transceiver 1910, shown and described in FIG. 19, may provide a means to at least one of output first signaling, for transmission to the second apparatus, based on the first bit map or obtain second signaling, from the second apparatus based on the first bit map.

In some examples, the first bit map further indicates a switch between a first bandwidth for a half-duplex resource assignment and a second bandwidth for a base station full-duplex resource assignment. In some examples, the base station full-duplex resource assignment may include an uplink resource assignment on a first sub-band of the first frequency band for a first user equipment, a first downlink resource assignment on a second sub-band of the first frequency band for a second user equipment, and a second downlink resource assignment on a third sub-band of the first frequency band for the second user equipment. In some examples, the base station full-duplex resource assignment may include an uplink resource assignment on a first sub-band of the first frequency band for a first user equipment, and a first downlink resource assignment on a second sub-band of the first frequency band for a second user equipment.

In some examples, the first bit map may include a first value indicating a half-duplex sub-band of the first frequency band. In some examples, the first bit map may include a second value indicating a downlink or uplink sub-band full-duplex sub-band of the first frequency band.

In some examples, the first bit map may include a first bandwidth assignment for a first time period. In some examples, the first bit map may include a second bandwidth assignment for a second time period.

In some examples, the first apparatus may, prior to obtaining the first bit map, output for transmission to the second apparatus a half-duplex resource configuration that specifies that the second apparatus is to use a half-duplex bandwidth resource assignment during a first time period. In some examples, the first bit map specifies that the second apparatus is to use a full-duplex bandwidth resource assignment instead of the half-duplex bandwidth resource assignment (e.g., during the first time period).

In some examples, the first apparatus may output for transmission to the second apparatus a first resource configuration and a second resource configuration. In some examples, a first subset of bits of the first bit map associated with a first subset of symbols or slots specifies, for each of a first set of resources, that the second apparatus is to use the first resource configuration. In some examples, a second subset of bits of the first bit map associated with a second subset of symbols or slots specifies, for each of a second set of resources, that the second apparatus is to use the second resource configuration.

In some examples, the first resource configuration is associated with a first frequency bandwidth. In some examples, the second resource configuration is associated with a second frequency bandwidth that is different from the first frequency bandwidth.

In some examples, the first signaling may include a downlink reference signal or other downlink signal. In some examples, the second signaling may include an uplink reference signal or other uplink signal.

In some examples, the first bit map further indicates periodic switching between different bandwidth resource assignments or non-periodic switching between the different bandwidth resource assignments.

In some examples, the first apparatus may output for transmission to the second apparatus a second bit map to be used by the first apparatus. In some examples, the first apparatus may output for transmission to the second apparatus a message that indicates that the first bit map or the second bit map is active or selected for a period of time or for a quantity of time periods. In some examples, the first signaling is output during the period of time or the quantity of time periods.

In some examples, the first apparatus may output for transmission to the second apparatus a first medium access control-control element that activates the first bit map or the second bit map. In some examples, the first apparatus may output for transmission to the second apparatus a second medium access control-control element that deactivates the first bit map or the second bit map.

In some examples, the first apparatus may output for transmission to the second apparatus downlink control information that indicates a selection of the first bit map or the second bit map. In some examples, the downlink control information further indicates that the selection of the first bit map or the second bit map applies for a defined quantity of time slots.

In some examples, the second signaling may include semi-persistent signaling. In some examples, the second signaling may include configured grant signaling. In some examples, the second signaling may include sounding reference signaling.

Figure 21:
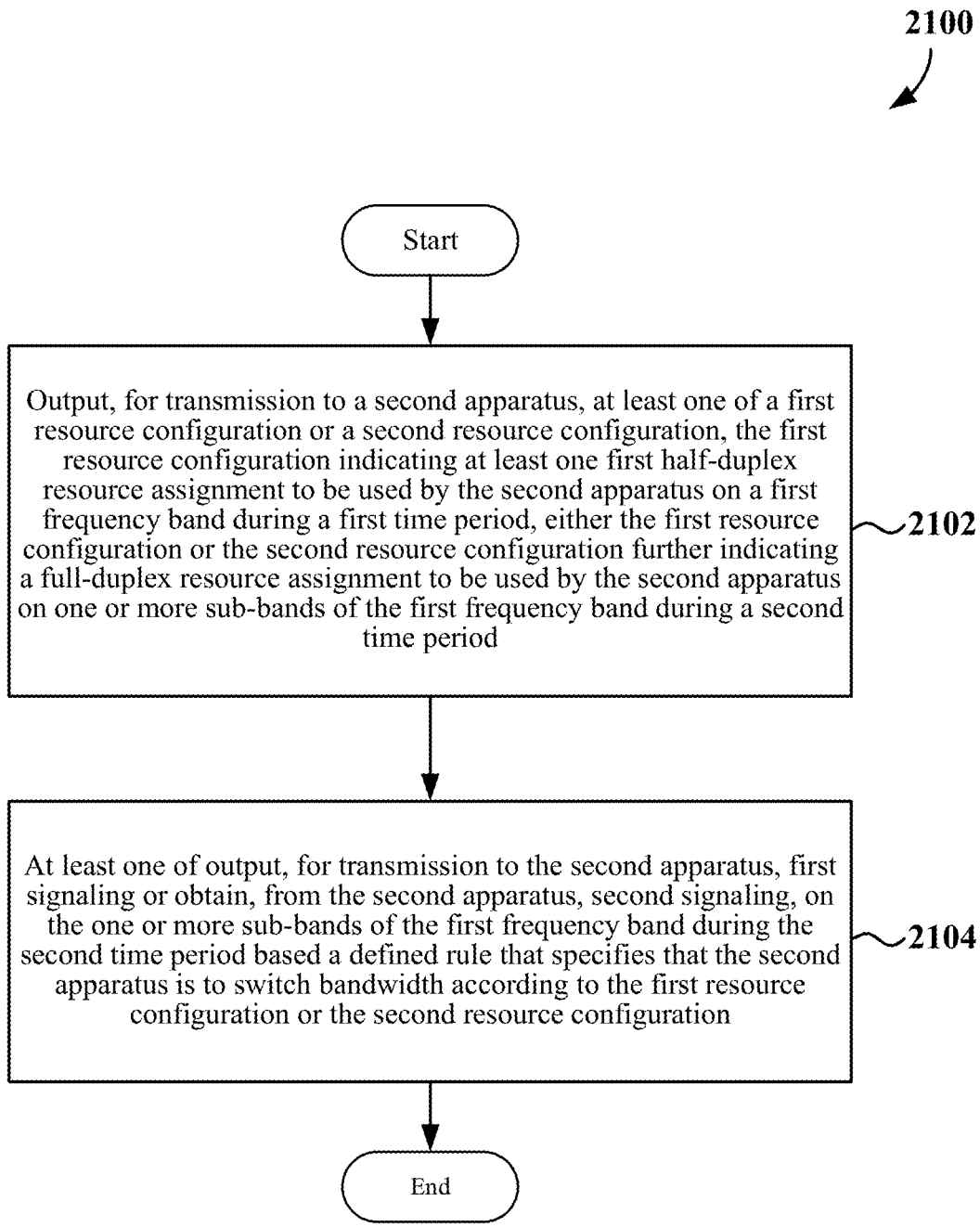
FIG. 21 is a flow chart illustrating an example communication method involving communicating based on a defined rule according to some aspects.

FIG. 21 is a flow chart illustrating an example method 2100 for communication in accordance with some aspects of the present disclosure. As described below, some or all illustrated features may be omitted in a particular implementation within the scope of the present disclosure, and some illustrated features may not be required for implementation of all examples. In some examples, the method 2100 may be carried out by the apparatus 1900 illustrated in FIG. 19. In some examples, the method 2100 may be carried out by any suitable apparatus or means for carrying out the functions or algorithm described below.

At block 2102, a first apparatus may output, for transmission to a second apparatus, at least one of a first resource configuration or a second resource configuration, the first resource configuration indicating at least one first half-duplex resource assignment to be used by the second apparatus on a first frequency band during a first time period, either the first resource configuration or the second resource configuration further indicating a full-duplex resource assignment to be used by the second apparatus on one or more sub-bands of the first frequency band during a second time period. In some examples, the bandwidth mapping circuitry 1943, shown and described in FIG. 19, may provide a means to output, for transmission to a second apparatus, at least one of a first resource configuration or a second resource configuration. In some examples, the bandwidth mapping circuitry 1943 together with the communication and processing circuitry 1941 and the transceiver 1910, shown and described in FIG. 19, may provide a means to output, for transmission to a second apparatus, at least one of a first resource configuration or a second resource configuration.

At block 2104, the first apparatus may at least one of output, for transmission to the second apparatus, first signaling or obtain, from the second apparatus, second signaling, on the one or more sub-bands of the first frequency band during the second time period based a defined rule that specifies that the second apparatus is to switch bandwidth according to the first resource configuration or the second resource configuration. In some examples, the bandwidth mapping circuitry 1943, shown and described in FIG. 19, may provide a means to at least one of output, for transmission to the second apparatus, first signaling or obtain, from the second apparatus, second signaling, on the one or more sub-bands of the first frequency band during the second time period based a defined rule that specifies that the second apparatus is to switch bandwidth according to the first resource configuration or the second resource configuration. In some examples, the bandwidth mapping circuitry 1943 together with the communication and processing circuitry 1941 and the transceiver 1910, shown and described in FIG. 19, may provide a means to at least one of output, for transmission to the second apparatus, first signaling or obtain, from the second apparatus, second signaling, on the one or more sub-bands of the first frequency band during the second time period based a defined rule that specifies that the second apparatus is to switch bandwidth according to the first resource configuration or the second resource configuration.

In some examples, the first apparatus may output for transmission to the second apparatus third signaling on an entirety of the first frequency band during the first time period based the defined rule.

In some examples, the first signaling may include a first downlink reference signal or other downlink signal. In some examples, the second signaling may include a second downlink reference signal or other downlink signal.

In some examples, the defined rule is specified by a wireless communication standard. In some examples, the first apparatus may output for transmission to the second apparatus the defined rule from the second apparatus or a third apparatus.

In some examples, the first resource configuration is associated with a first frequency bandwidth. In some examples, the second resource configuration is associated with a second frequency bandwidth that is different from the first frequency bandwidth.

In some examples, the second signaling may include semi-persistent signaling. In some examples, the second signaling may include configured grant signaling. In some examples, the second signaling may include sounding reference signaling.

Figure 22:
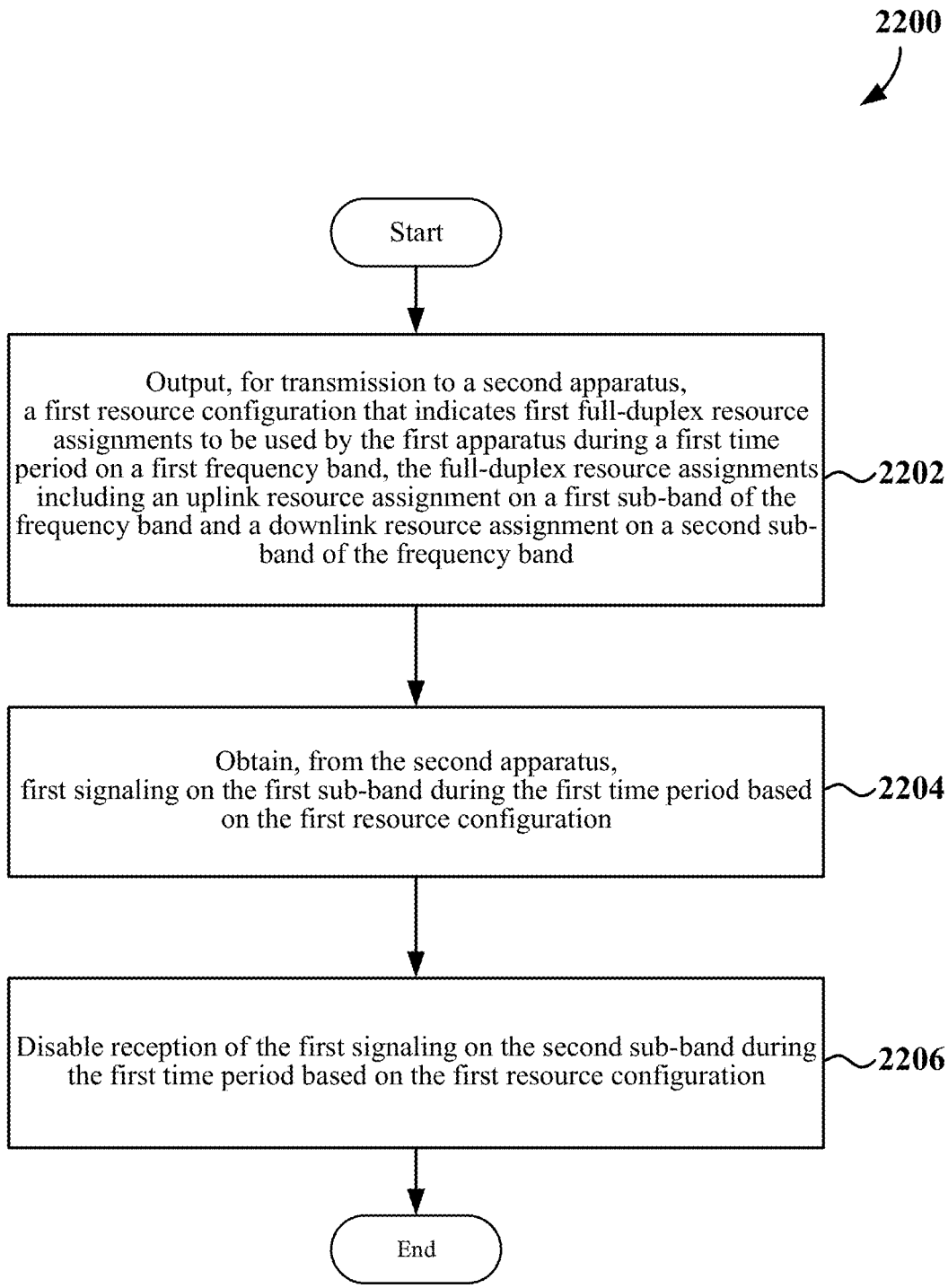
FIG. 22 is a flow chart illustrating an example communication method involving providing a resource configuration according to some aspects.

FIG. 22 is a flow chart illustrating an example method 2200 for communication in accordance with some aspects of the present disclosure. As described below, some or all illustrated features may be omitted in a particular implementation within the scope of the present disclosure, and some illustrated features may not be required for implementation of all examples. In some examples, the method 2200 may be carried out by the apparatus 1900 illustrated in FIG. 19. In some examples, the method 2200 may be carried out by any suitable apparatus or means for carrying out the functions or algorithm described below.

At block 2202, a first apparatus may output, for transmission to a second apparatus, a first resource configuration that indicates full-duplex resource assignments to be used by the first apparatus during a first time period on a frequency band, the full-duplex resource assignments including an uplink resource assignment on a first sub-band of the frequency band and a downlink resource assignment on a second sub-band of the frequency band. In some examples, the configuration circuitry 1942, shown and described in FIG. 19, may provide a means to output, for transmission to a second apparatus, a first resource configuration that indicates full-duplex resource assignments to be used by the first apparatus during a first time period on a frequency band. In some examples, the configuration circuitry 1942 together with the communication and processing circuitry 1941 and the transceiver 1910, shown and described in FIG. 19, may provide a means to output, for transmission to a second apparatus, a first resource configuration that indicates full-duplex resource assignments to be used by the first apparatus during a first time period on a frequency band.

At block 2204, the first apparatus may obtain, from the second apparatus, first signaling on the first sub-band during the first time period based on the first resource configuration. In some examples, the bandwidth mapping circuitry 1943, shown and described in FIG. 19, may provide a means to obtain, from the second apparatus, first signaling on the first sub-band during the first time period based on the first resource configuration. In some examples, the bandwidth mapping circuitry 1943 together with the communication and processing circuitry 1941 and the transceiver 1910, shown and described in FIG. 19, may provide a means to obtain, from the second apparatus, first signaling on the first sub-band during the first time period based on the first resource configuration.

At block 2206, the first apparatus may disable reception of the first signaling on the second sub-band during the first time period based on the first resource configuration. In some examples, the bandwidth mapping circuitry 1943, shown and described in FIG. 19, may provide a means to disable reception of the first signaling on the second sub-band during the first time period based on the first resource configuration. In some examples, the bandwidth mapping circuitry 1943 together with the communication and processing circuitry 1941 and the transceiver 1910, shown and described in FIG. 19, may provide a means to disable reception of the first signaling on the second sub-band during the first time period based on the first resource configuration.

In some examples, the first signaling may include semi-persistent signaling, configured grant signaling, or sounding reference signaling. In some examples, the time period is a time slot or an orthogonal frequency division multiplexing (OFDM) symbol period. In some examples, the first resource configuration may include a bit map.

In some examples, the first apparatus may output second signaling for transmission on the first sub-band during a second time period based on the first resource configuration. In some examples, the first apparatus may disable transmission of the second signaling on the second sub-band during the second time period based on the first resource configuration. In some examples, the second signaling may include a downlink reference signal.

In some examples, the outputting of the first resource configuration may include outputting, for transmission to the second apparatus, a radio resource control (RRC) message that includes the first resource configuration.

In some examples, the outputting of the first resource configuration may include outputting, for transmission to the second apparatus, a radio resource control (RRC) message that includes the first resource configuration and at least one second resource configuration that indicates second full-duplex resource assignments to be used by the second apparatus during the first time period on the frequency band.

In some examples, the first apparatus may obtain a medium access control-control element (MAC-CE) that activates the first resource configuration or the second resource configuration. In some examples, the first apparatus may obtain downlink control information that indicates a selection of the first resource configuration or the second resource configuration. In some examples, the first resource configuration identifies, for a plurality of time periods, half-duplex resources and full-duplex resources.

In some examples, the disabling of the reception of the first signaling on the second sub-band during the first time period is further based on a defined rule that specifies that the first apparatus is to alter transmit bandwidth and receive bandwidth based on the identified half-duplex resources and full-duplex resources.

In some examples, the first apparatus may include a transceiver configured to transmit the first resource configuration, and to receive the first signaling, wherein the first apparatus is configured as a network entity.

Referring again to FIG. 19, in one configuration, the apparatus 1900 includes means for outputting, for transmission to a second apparatus, a first bit map that indicates symbol-level or slot-level bandwidth switching to be used by the second apparatus on a first frequency band, and means for at least one of outputting first signaling, for transmission to the second apparatus, based on the first bit map or obtaining second signaling, from the second apparatus based on the first bit map. In one configuration, the apparatus 1900 includes means for outputting, for transmission to a second apparatus, at least one of a first resource configuration or a second resource configuration, the first resource configuration indicating at least one first half-duplex resource assignment to be used by the second apparatus on a first frequency band during a first time period, either the first resource configuration or the second resource configuration further indicating a full-duplex resource assignment to be used by the second apparatus on one or more sub-bands of the first frequency band during a second time period, and means for at least one of outputting, for transmission to the second apparatus, first signaling or obtaining, from the second apparatus, second signaling, on the one or more sub-bands of the first frequency band during the second time period based a defined rule that specifies that the second apparatus is to switch bandwidth according to the first resource configuration or the second resource configuration. In one configuration, the apparatus 1900 includes means for outputting, for transmission to a second apparatus, a first resource configuration that indicates full-duplex resource assignments to be used by the first apparatus during a first time period on a frequency band, the full-duplex resource assignments including an uplink resource assignment on a first sub-band of the frequency band and a downlink resource assignment on a second sub-band of the frequency band, means for obtaining, from the second apparatus, first signaling on the first sub-band during the first time period based on the first resource configuration, and means for disabling reception of the first signaling on the second sub-band during the first time period based on the first resource configuration. In one aspect, the aforementioned means may be the processor 1904 shown in FIG. 19 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable medium 1906, or any other suitable apparatus or means described in any one or more of FIGS. 1, 2, 3, 7, 8A, 9, 12, 13, 14, and 19 and utilizing, for example, the methods and/or algorithms described herein in relation to FIGS. 20-22.

The methods shown in FIGS. 16-18 and 20-22 may include additional aspects, such as any single aspect or any combination of aspects described below and/or in connection with one or more other processes described elsewhere herein. The following provides an overview of several aspects of the present disclosure.

Aspect 1: A method for wireless communication at a first apparatus (e.g., a user equipment), the method comprising: obtaining a first bit map from a second apparatus, the first bit map indicating symbol-level or slot-level bandwidth switching to be used by the first apparatus on a first frequency band; and at least one of obtaining, from the second apparatus, first signaling based on the first bit map or outputting, for transmission to the second apparatus, second signaling based on the first bit map.

Aspect 2: The method of aspect 1, wherein the first bit map further indicates a switch between a first bandwidth for a half-duplex resource assignment and a second bandwidth for a base station full-duplex resource assignment.

Aspect 3: The method of aspect 2, wherein the base station full-duplex resource assignment comprises an uplink resource assignment on a first sub-band of the first frequency band for a first user equipment, a first downlink resource assignment on a second sub-band of the first frequency band for a second user equipment, and a second downlink resource assignment on a third sub-band of the first frequency band for the second user equipment.

Aspect 4: The method of aspect 2, wherein the base station full-duplex resource assignment comprises an uplink resource assignment on a first sub-band of the first frequency band for a first user equipment, and a first downlink resource assignment on a second sub-band of the first frequency band for a second user equipment.

Aspect 5: The method of any of aspects 1 through 4, wherein the first bit map comprises: a first value indicating a half-duplex sub-band of the first frequency band; and a second value indicating a downlink or uplink sub-band full-duplex sub-band of the first frequency band.

Aspect 6: The method of any of aspects 1 through 5, wherein the first bit map comprises: a first bandwidth assignment for a first time period; and a second bandwidth assignment for a second time period.

Aspect 7: The method of any of aspects 1 through 6, wherein: the method further comprises, prior to obtaining the first bit map, obtaining a half-duplex resource configuration that specifies that the first apparatus is to use a half-duplex bandwidth resource assignment during a first time period; and the first bit map specifies that the first apparatus is to use a full-duplex bandwidth resource assignment instead of the half-duplex bandwidth resource assignment during the first time period.

Aspect 8: The method of any of aspects 1 through 7, wherein: the method further comprises obtaining a first resource configuration and a second resource configuration; a first subset of bits of the first bit map associated with a first subset of symbols or slots specifies, for each of a first set of resources, that the first apparatus is to use the first resource configuration; and a second subset of bits of the first bit map associated with a second subset of symbols or slots specifies, for each of a second set of resources, that the first apparatus is to use the second resource configuration.

Aspect 9: The method of aspect 8, wherein: the first resource configuration is associated with a first frequency bandwidth; and the second resource configuration is associated with a second frequency bandwidth that is different from the first frequency bandwidth.

Aspect 10: The method of any of aspects 1 through 9, wherein at least one of: the first signaling comprises a downlink reference signal or other downlink signal; or the second signaling comprises an uplink reference signal or other uplink signal.

Aspect 11: The method of any of aspects 1 through 10, wherein the bit map further indicates periodic switching between different bandwidth resource assignments or non-periodic switching between the different bandwidth resource assignments.

Aspect 12: The method of any of aspects 1 through 11, further comprising: obtaining a second bit map to be used by the first apparatus; and obtaining a message that indicates that the first bit map or the second bit map is active or selected for a period of time or for a quantity of time periods; wherein the first signaling is obtained during the period of time or the quantity of time periods.

Aspect 13: The method of any of aspects 1 through 10, further comprising: obtaining a second bit map to be used by the first apparatus; and obtaining a first medium access control-control element that activates the first bit map or the second bit map.

Aspect 14: The method of aspect 13, further comprising: obtaining a second medium access control-control element that deactivates the first bit map or the second bit map.

Aspect 15: The method of any of aspects 1 through 10, further comprising: obtaining a second bit map to be used by the first apparatus; and obtaining downlink control information that indicates a selection of the first bit map or the second bit map.

Aspect 16: The method of aspect 15, wherein the downlink control information further indicates that the selection of the first bit map or the second bit map applies for a defined quantity of time slots.

Aspect 17: The method of any of aspects 1 through 16, wherein the second signaling comprises semi-persistent signaling, configured grant signaling, or sounding reference signaling.

Aspect 18: A method for wireless communication at a first apparatus (e.g., a network entity), the method comprising: outputting, for transmission to a second apparatus, a first bit map that indicates symbol-level or slot-level bandwidth switching to be used by the second apparatus on a first frequency band; and at least one of outputting first signaling, for transmission to the second apparatus, based on the first bit map or obtaining second signaling, from the second apparatus based on the first bit map.

Aspect 19: The method of aspect 18, wherein: the method further comprises, prior to outputting the first bit map, outputting for transmission to the second apparatus a half-duplex resource configuration that specifies that the second apparatus is to use a half-duplex bandwidth resource assignment during a first time period; and the first bit map specifies that the second apparatus is to use a full-duplex bandwidth resource assignment instead of the half-duplex bandwidth resource assignment during the first time period.

Aspect 20: The method of any of aspects 18 through 19, wherein: the method further comprises outputting for transmission to the second apparatus a first resource configuration and a second resource configuration; a first subset of bits of the first bit map associated with a first subset of symbols or slots specifies, for each of a first set of resources, that the second apparatus is to use the first resource configuration; and a second subset of bits of the first bit map associated with a second subset of symbols or slots specifies, for each of a second set of resources, that the second apparatus is to use the second resource configuration.

Aspect 21: The method of any of aspects 18 through 20, further comprising: outputting, for transmission to the second apparatus, a second bit map to be used by the second apparatus.

Aspect 22: The method of aspect 21, further comprising: outputting, for transmission to the second apparatus, a medium access control-control element that activates or deactivates the first bit map or the second bit map; or outputting, for transmission to the second apparatus, downlink control information that indicates a selection of the first bit map or the second bit map.

Aspect 23: A method for wireless communication at a first apparatus (e.g., a user equipment), the method comprising: obtaining, from a second apparatus, at least one of a first resource configuration or a second resource configuration, the first resource configuration indicating at least one first half-duplex resource assignment to be used by the first apparatus on a first frequency band during a first time period, either the first resource configuration or the second resource configuration further indicating a full-duplex resource assignment to be used by the first apparatus on one or more sub-bands of the first frequency band during a second time period; and at least one of obtaining first signaling from the second apparatus or outputting second signaling, for transmission to the second apparatus, on the one or more sub-bands of the first frequency band during the second time period based a defined rule that specifies that the first apparatus is to switch bandwidth according to the first resource configuration or the second resource configuration.

Aspect 24: The method of aspect 23, further comprising: obtaining, from the second apparatus, third signaling on an entirety of the first frequency band during the first time period based the defined rule.

Aspect 25: The method of any of aspects 23 through 24, wherein at least one of: the first signaling comprises a first downlink reference signal or other downlink signal; or the second signaling comprises a second downlink reference signal or other downlink signal.

Aspect 26: The method of any of aspects 23 through 25, wherein: the defined rule is specified by a wireless communication standard; or the method further comprises obtaining the defined rule from the second apparatus or a third apparatus.

Aspect 27: A method for wireless communication at a first apparatus (e.g., a network entity), the method comprising: outputting, for transmission to a second apparatus, at least one of a first resource configuration or a second resource configuration, the first resource configuration indicating at least one first half-duplex resource assignment to be used by the second apparatus on a first frequency band during a first time period, either the first resource configuration or the second resource configuration further indicating a full-duplex resource assignment to be used by the second apparatus on one or more sub-bands of the first frequency band during a second time period; and at least one of outputting, for transmission to the second apparatus, first signaling or obtaining, from the second apparatus, second signaling, on the one or more sub-bands of the first frequency band during the second time period based a defined rule that specifies that the second apparatus is to switch bandwidth according to the first resource configuration or the second resource configuration.

Aspect 28: The method of aspect 27, wherein: the method further comprises outputting, for transmission to the second apparatus, third signaling on an entirety of the first frequency band during the first time period based the defined rule; the first signaling comprises a first downlink reference signal or other downlink signal; and the second signaling comprises a second downlink reference signal or other downlink signal.

Aspect 29: The method of any of aspects 27 through 28, wherein the defined rule is specified by a wireless communication standard.

Aspect 30: The method of any of aspects 1 through 17, further comprising: a transceiver configured to receive the first bit map and the first signaling, and transmit the second signaling, wherein the first apparatus is configured as a user equipment.

Aspect 31: The method of any of aspects 18 through 22, further comprising: a transceiver configured to transmit the first bit map and the first signaling, and receive the second signaling, wherein the first apparatus is configured as a network entity.

Aspect 32: The method of any of aspects 23 through 26, further comprising: a transceiver configured to receive the first signaling and the at least one of the first resource configuration or the second resource configuration, and transmit the second signaling, wherein the first apparatus is configured as a user equipment.

Aspect 33: The method of any of aspects 27 through 29, further comprising: a transceiver configured to transmit the first signaling and the at least one of the first resource configuration or the second resource configuration, and receive the second signaling, wherein the first apparatus is configured as a network entity.

Aspect 34: A user equipment, comprising: at least one transceiver; a memory comprising instructions; and one or more processors configured to execute the instructions and cause the user equipment to perform a method in accordance with any one or more of aspects 1 through 17, wherein the at least one transceiver is configured to receive the first bit map and the second signaling, and transmit the first signaling.

Aspect 35: A first apparatus configured for communication comprising at least one means for performing any one or more of aspects 1 through 17 and 30.

Aspect 36: A non-transitory computer-readable medium storing computer-executable code, comprising code for causing a first apparatus to perform any one or more of aspects 1 through 17 and 30.

Aspect 37: A first apparatus, comprising: a memory comprising instructions; and one or more processors configured to execute the instructions and cause the first apparatus to perform a method in accordance with any one or more of aspects 1 through 17.

Aspect 38: A network entity, comprising: at least one transceiver; a memory comprising instructions; and one or more processors configured to execute the instructions and cause the network entity to perform a method in accordance with any one or more of aspects 18 through 22, wherein the at least one transceiver is configured to transmit the first bit map and the first signaling, and receive the second signaling.

Aspect 39: A first apparatus configured for communication comprising at least one means for performing any one or more of aspects 18 through 22 and 31.

Aspect 40: A non-transitory computer-readable medium storing computer-executable code, comprising code for causing a first apparatus to perform any one or more of aspects 18 through 22 and 31.

Aspect 41: A first apparatus, comprising: a memory comprising instructions; and one or more processors configured to execute the instructions and cause the first apparatus to perform a method in accordance with any one or more of aspects 18 through 22.

Aspect 42: A user equipment, comprising: at least one transceiver; a memory comprising instructions; and one or more processors configured to execute the instructions and cause the user equipment to perform a method in accordance with any one or more of aspects 23 through 26, wherein the at least one transceiver is configured to receive the first signaling and the at least one of the first resource configuration or the second resource configuration, and transmit the second signaling.

Aspect 43: A first apparatus configured for communication comprising at least one means for performing any one or more of aspects 23 through 26 and 32.

Aspect 44: A non-transitory computer-readable medium storing computer-executable code, comprising code for causing a first apparatus to perform any one or more of aspects 23 through 26 and 32.

Aspect 45: A first apparatus, comprising: a memory comprising instructions; and one or more processors configured to execute the instructions and cause the first apparatus to perform a method in accordance with any one or more of aspects 23 through 26.

Aspect 46: A network entity, comprising: at least one transceiver; a memory comprising instructions; and one or more processors configured to execute the instructions and cause the network entity to perform a method in accordance with any one or more of aspects 27 through 29, wherein the at least one transceiver is configured to transmit the first signaling and the at least one of the first resource configuration or the second resource configuration, and receive the second signaling.

Aspect 47: A first apparatus configured for communication comprising at least one means for performing any one or more of aspects 27 through 29 and 33.

Aspect 48: A non-transitory computer-readable medium storing computer-executable code, comprising code for causing a first apparatus to perform any one or more of aspects 27 through 29 and 33.

Aspect 49: A first apparatus, comprising: a memory comprising instructions; and one or more processors configured to execute the instructions and cause the first apparatus to perform a method in accordance with any one or more of aspects 27 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 5, 6, 8, 9, 10, 15, and 19 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first apparatus for communication, comprising:
a processing system configured to
obtain first signaling comprising a first bit map from a second apparatus, the first bit map indicating symbol-level or slot-level bandwidth switching to be used by the first apparatus on a first frequency band, the first bit map further indicating a switch between a first bandwidth for a half-duplex resource assignment and a second bandwidth for a base station full-duplex resource assignment; and
at least one of obtain, from the second apparatus, second signaling based on the first bit map or output, for transmission to the second apparatus, third signaling based on the first bit map.

2. The first apparatus of claim 1, wherein the base station full-duplex resource assignment comprises an uplink resource assignment on a first sub-band of the first frequency band for a first user equipment, a first downlink resource assignment on a second sub-band of the first frequency band for a second user equipment, and a second downlink resource assignment on a third sub-band of the first frequency band for the second user equipment.

3. The first apparatus of claim 1, wherein the base station full-duplex resource assignment comprises an uplink resource assignment on a first sub-band of the first frequency band for a first user equipment, and a first downlink resource assignment on a second sub-band of the first frequency band for a second user equipment.

4. The first apparatus of claim 1, wherein the first bit map comprises:
a first value indicating a half-duplex sub-band of the first frequency band; and
a second value indicating a downlink or uplink sub-band full-duplex sub-band of the first frequency band.

5. The first apparatus of claim 1, wherein the first bit map comprises:
a first bandwidth assignment for a first time period; and
a second bandwidth assignment for a second time period.

6. The first apparatus of claim 1, wherein:
the processing system is further configured to, prior to the first bit map being obtained, obtain a half-duplex resource configuration that specifies that the first apparatus is to use a half-duplex bandwidth resource assignment during a first time period; and
the first bit map specifies that the first apparatus is to use a full-duplex bandwidth resource assignment instead of the half-duplex bandwidth resource assignment during the first time period.

7. The first apparatus of claim 1, wherein:
the processing system is further configured to obtain a first resource configuration and a second resource configuration;
a first subset of bits of the first bit map associated with a first subset of symbols or slots specifies, for each of a first set of resources, that the first apparatus is to use the first resource configuration; and
a second subset of bits of the first bit map associated with a second subset of symbols or slots specifies, for each of a second set of resources, that the first apparatus is to use the second resource configuration.

8. The first apparatus of claim 7, wherein:
the first resource configuration is associated with a first frequency bandwidth; and
the second resource configuration is associated with a second frequency bandwidth that is different from the first frequency bandwidth.

9. The first apparatus of claim 1, wherein at least one of:
the second signaling comprises a downlink reference signal or other downlink signal; or
the third signaling comprises an uplink reference signal or other uplink signal.

10. The first apparatus of claim 1, wherein the first bit map further indicates periodic switching between different bandwidth resource assignments or non-periodic switching between the different bandwidth resource assignments.

11. The first apparatus of claim 1, wherein:
the processing system is further configured to obtain a second bit map to be used by the first apparatus;
the processing system is further configured to obtain a message that indicates that the first bit map or the second bit map is active or selected for a period of time or for a quantity of time periods; and
the second signaling is obtained during the period of time or the quantity of time periods.

12. The first apparatus of claim 1, wherein the processing system is further configured to:
obtain a second bit map to be used by the first apparatus; and
obtain a first medium access control-control element that activates the first bit map or the second bit map.

13. The first apparatus of claim 12, wherein the processing system is further configured to:
obtain a second medium access control-control element that deactivates the first bit map or the second bit map.

14. The first apparatus of claim 1, wherein the processing system is further configured to:
obtain a second bit map to be used by the first apparatus; and
obtain downlink control information that indicates a selection of the first bit map or the second bit map.

15. The first apparatus of claim 14, wherein the downlink control information further indicates that the selection of the first bit map or the second bit map applies for a defined quantity of time slots.

16. The first apparatus of claim 1, further comprising:
a transceiver configured to receive the first signaling and the second signaling, and transmit the third signaling,
wherein the first apparatus is configured as a user equipment.

17. A first apparatus for communication, comprising:
a processing system configured to
output, for transmission to a second apparatus, first signaling comprising a first bit map that indicates symbol-level or slot-level bandwidth switching to be used by the second apparatus on a first frequency band, the first bit map further indicating a switch between a first bandwidth for a half-duplex resource assignment and a second bandwidth for a base station full-duplex resource assignment; and
at least one of output second signaling, for transmission to the second apparatus, based on the first bit map or obtain third signaling, from the second apparatus based on the first bit map.

18. The first apparatus of claim 17, wherein:
the processing system is further configured to, prior to the first bit map being output, output for transmission to the second apparatus a half-duplex resource configuration that specifies that the second apparatus is to use a half-duplex bandwidth resource assignment during a first time period; and
the first bit map specifies that the second apparatus is to use a full-duplex bandwidth resource assignment instead of the half-duplex bandwidth resource assignment.

19. The first apparatus of claim 17, wherein:
the processing system is further configured to output for transmission to the second apparatus a first resource configuration and a second resource configuration;
a first subset of bits of the first bit map associated with a first subset of symbols or slots specifies, for each of a first set of resources, that the second apparatus is to use the first resource configuration; and
a second subset of bits of the first bit map associated with a second subset of symbols or slots specifies, for each of a second set of resources, that the second apparatus is to use the second resource configuration.

20. The first apparatus of claim 17, wherein the processing system is further configured to:
output, for transmission to the second apparatus, a second bit map to be used by the second apparatus;
output, for transmission to the second apparatus, a medium access control-control element that activates or deactivates the first bit map or the second bit map; or
output, for transmission to the second apparatus, downlink control information that indicates a selection of the first bit map or the second bit map.

21. The first apparatus of claim 17, further comprising:
a transceiver configured to transmit the first signaling and the second signaling, and receive the third signaling,
wherein the first apparatus is configured as a network entity.

22. A method for communication at a first apparatus, comprising:
obtaining first signaling comprising a first bit map from a second apparatus, the first bit map indicating symbol-level or slot-level bandwidth switching to be used by the first apparatus on a first frequency band, the first bit map further indicating a switch between a first bandwidth for a half-duplex resource assignment and a second bandwidth for a base station full-duplex resource assignment; and
at least one of obtaining, from the second apparatus, second signaling based on the first bit map or outputting, for transmission to the second apparatus, third signaling based on the first bit map.

23. The method of claim 22, wherein the base station full-duplex resource assignment comprises an uplink resource assignment on a first sub-band of the first frequency band for a first user equipment, a first downlink resource assignment on a second sub-band of the first frequency band for a second user equipment, and a second downlink resource assignment on a third sub-band of the first frequency band for the second user equipment.

24. The method of claim 22, wherein the base station full-duplex resource assignment comprises an uplink resource assignment on a first sub-band of the first frequency band for a first user equipment, and a first downlink resource assignment on a second sub-band of the first frequency band for a second user equipment.

* * * * *